United States Patent
Hendry et al.

(10) Patent No.: US 12,382,053 B2
(45) Date of Patent: Aug. 5, 2025

(54) IN-LOOP FILTERING-BASED IMAGE CODING DEVICE AND METHOD

(71) Applicant: LG ELECTRONICS INC., Seoul (KR)

(72) Inventors: Hendry Hendry, Seoul (KR); Naeri Park, Seoul (KR); Hyeongmoon Jang, Seoul (KR); Jaehyun Lim, Seoul (KR); Junghak Nam, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 99 days.

(21) Appl. No.: 17/915,025

(22) PCT Filed: Mar. 15, 2021

(86) PCT No.: PCT/KR2021/003143
§ 371 (c)(1),
(2) Date: Sep. 27, 2022

(87) PCT Pub. No.: WO2021/201463
PCT Pub. Date: Oct. 7, 2021

(65) Prior Publication Data
US 2023/0164321 A1 May 25, 2023

Related U.S. Application Data

(60) Provisional application No. 63/003,293, filed on Apr. 1, 2020, provisional application No. 63/001,464, filed on Mar. 29, 2020.

(51) Int. Cl.
H04N 19/132 (2014.01)
H04N 19/172 (2014.01)
(Continued)

(52) U.S. Cl.
CPC ........ *H04N 19/132* (2014.11); *H04N 19/172* (2014.11); *H04N 19/46* (2014.11); *H04N 19/82* (2014.11)

(58) Field of Classification Search
None
See application file for complete search history.

(56) References Cited

U.S. PATENT DOCUMENTS

| 2013/0107973 A1* | 5/2013 | Wang | H04N 19/82 375/E7.193 |
| 2013/0188733 A1 | 7/2013 | Van der Auwera et al. | |
| 2022/0345747 A1* | 10/2022 | Wang | H04N 19/184 |

FOREIGN PATENT DOCUMENTS

| KR | 10-2014-0081882 A | 7/2014 |
| KR | 10-2014-0085541 A | 7/2014 |

OTHER PUBLICATIONS

JVET-Q2001, Joint Video Experts Team (JVET) of ITU-T SG 16 WP 3 and ISO/IEC JTC 1/SC 29/WG 11, Document: JVET-Q2001-vC, 17th Meeting: Brussels, BE, Jan. 7-17, 2020, Title: Versatile Video Coding (Draft 8); Status: Output document approved by JVET; Purpose: Draft text of video coding specification, Author(s): Benjamin Bross et al., (510 pages).

(Continued)

*Primary Examiner* — Xiaolan Xu
(74) *Attorney, Agent, or Firm* — Bryan Cave Leighton Paisner LLP

(57) ABSTRACT

According to embodiments of the present document, information for performing in-loop filtering across boundaries can be efficiently signaled. For example, the boundaries may include boundaries of tiles, slices, and/or sub-pictures.

15 Claims, 12 Drawing Sheets

(51) Int. Cl.
*H04N 19/46* (2014.01)
*H04N 19/82* (2014.01)

(56) References Cited

OTHER PUBLICATIONS

JVET-Q2002, Joint Video Experts Team (JVET) of ITU-T SG 16 WP 3 and ISO/IEC JTC 1/SC 29/WG 11, Document: JVET-Q2002-v3, 17th Meeting: Brussels, BE, Jan. 7-17, 2020, Title: Algorithm description for Versatile Video Coding and Test Model 8 (VTM 8), Status: Output document of JVET, Purpose: Algorithm description for Versatile Video Coding and Test Model 8, Author(s): Chen et al. (51 pages).

* cited by examiner

IN-LOOP FILTERING-BASED IMAGE CODING DEVICE AND METHOD

CROSS-REFERENCE TO RELATED APPLICATIONS

This application is the National Stage filing under 35 U.S.C. of International Application No. PCT/KR2021/003143, filed Mar. 15, 2021, which claims the benefit of earlier filing date and right of priority to U.S. Provisional Application No. 63/001,464, filed on Mar. 29, 2020, and U.S. Provisional Application No. 63/003,293, filed on Apr. 1, 2020, the contents of which are all hereby incorporated by reference herein in their entirety.

TECHNICAL FIELD

The present disclosure relates to an in-loop filtering-based image coding apparatus and method.

BACKGROUND ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

Specifically, an in-loop filtering procedure is performed to increase subjective/objective visual quality, and there is a discussion about a method for increasing the signaling efficiency of information related to the in-loop filtering procedure for a divided picture.

DISCLOSURE

Technical Problem

According to an embodiment of the present disclosure, a method and an apparatus for increasing image/video coding efficiency are provided.

According to an embodiment of the present disclosure, a efficient filtering application method and apparatus are provided.

According to an embodiment of the present disclosure, a method and apparatus for efficiently applying deblocking filtering, sample adaptive loop (SAO), and adaptive loop filtering (ALF) are provided.

According to an embodiment of the present disclosure, in-loop filtering may be performed based on specific boundaries.

According to an embodiment of the present disclosure, a flag indicating whether loop filtering is available across tiles in a subpicture may be signaled in a picture parameter set (PPS) for each subpicture.

According to an embodiment of the present disclosure, one flag in which a flag indicating that loop filtering is performed across tiles and a flag indicating that loop filtering is performed across slices is combined may be signaled in a sequence parameter set (SPS).

According to an embodiment of the present disclosure, a flag indicating that loop filtering is performed across tiles and a flag indicating that loop filtering is performed across slices may be signaled in the SPS for each subpicture.

According to an embodiment of the present disclosure, one flag indicating that loop filtering is performed across tile boundaries and slice boundaries may be signaled in the SPS for all subpictures.

According to an embodiment of the present disclosure, one flag indicating that loop filtering is performed across tile boundaries and slice boundaries may be signaled in PPS for all subpictures.

According to an embodiment of the present disclosure, an encoding apparatus for performing video/image encoding is provided.

According to one embodiment of the present disclosure, a computer-readable digital storage medium, in which encoded video/image information generated according to the video/image encoding method disclosed in at least one of the embodiments of the present disclosure is stored, is provided.

According to an embodiment of the present disclosure, a computer-readable digital storage medium, in which encoded information or encoded video/image information causing performing a video/image decoding method disclosed in at least one of the embodiments of the present disclosure by a decoding apparatus.

Technical Effects

According to an embodiment of the present disclosure, overall video/image compression efficiency may be increased.

According to an embodiment of the present disclosure, subjective/objective visual quality may be increased through efficient filtering.

According to an embodiment of the present disclosure, an in-loop filtering procedure based on specific boundaries may be efficiently performed and filtering performance may be improved.

According to an embodiment of the present disclosure, information for in-loop filtering based on specific boundaries may be efficiently signaled and bits for information transmission may be saved.

According to an embodiment of the present disclosure, control performance for application of a loop filter to an edge at a boundary of subpictures, tiles, and/or rectangular slices may be improved.

DESCRIPTION OF DIAGRAMS

FIG. 1 schematically illustrates an example of a video/image coding system to which the present disclosure is applicable.

Figure 4:
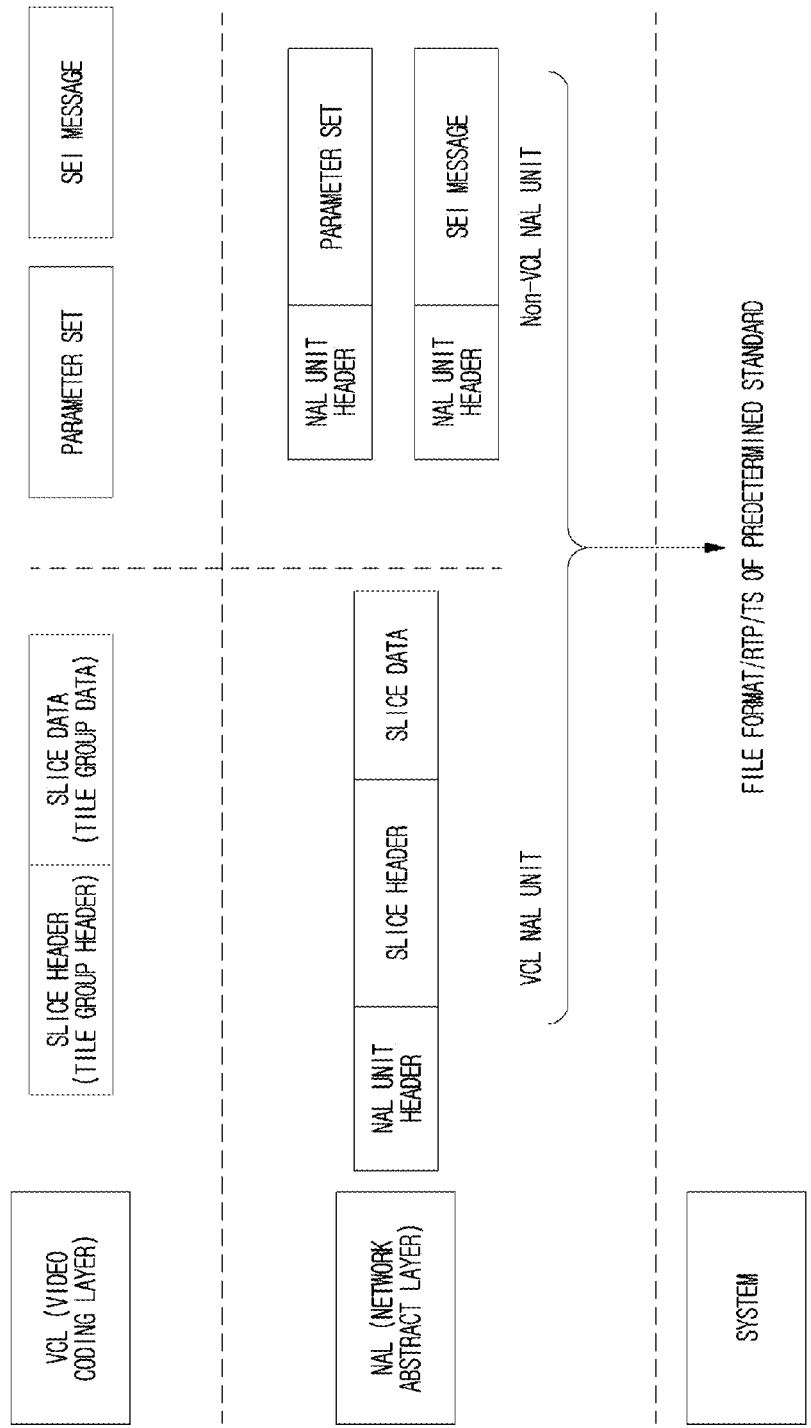

FIG. 4 exemplarily illustrates a hierarchical structure for a coded image/video.

Figure 5:
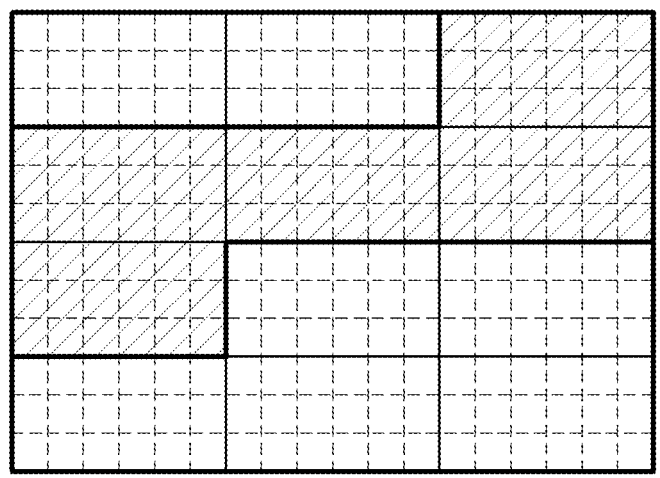

FIG. 5 exemplarily illustrates a picture including CTUs.

Figure 6:
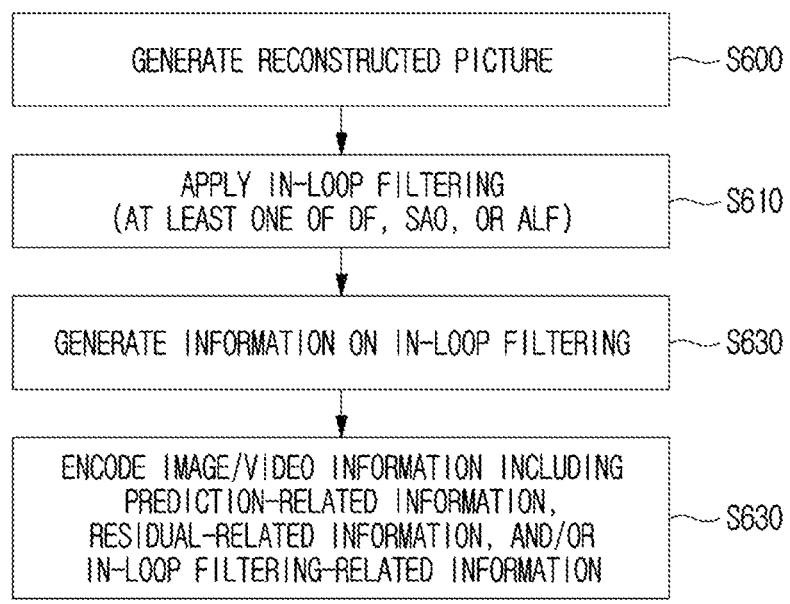

FIG. 6 is a flowchart illustrating a filtering-based encoding method in an encoding apparatus.

Figure 7:
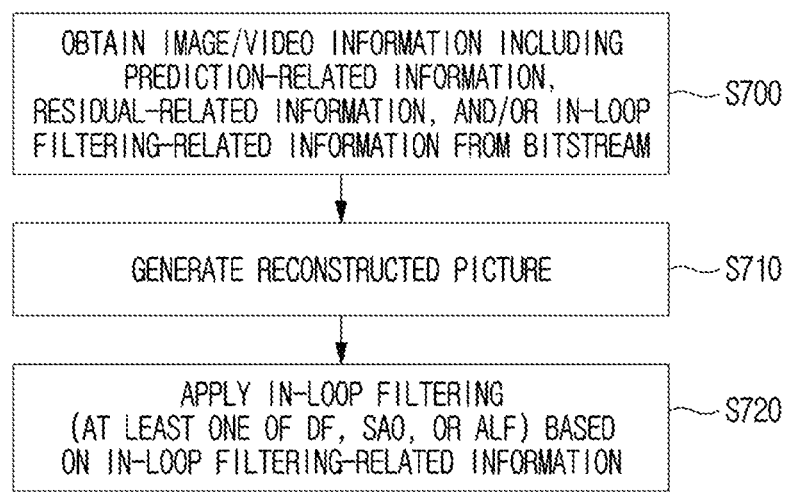

FIG. 7 is a flowchart for explaining a filtering-based decoding method in a decoding apparatus.

Figure 8:
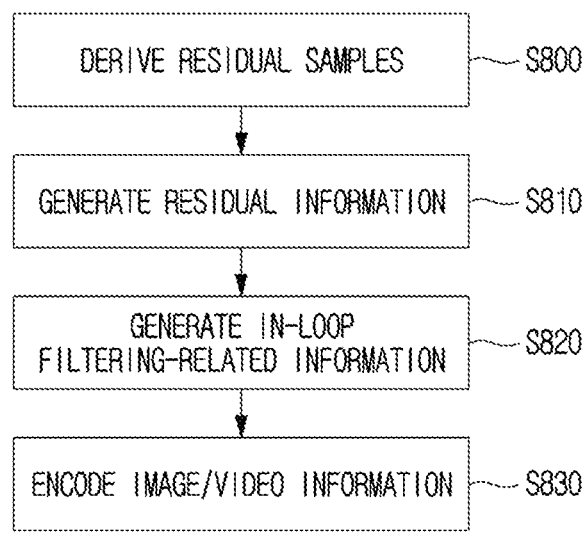
Figure 9:
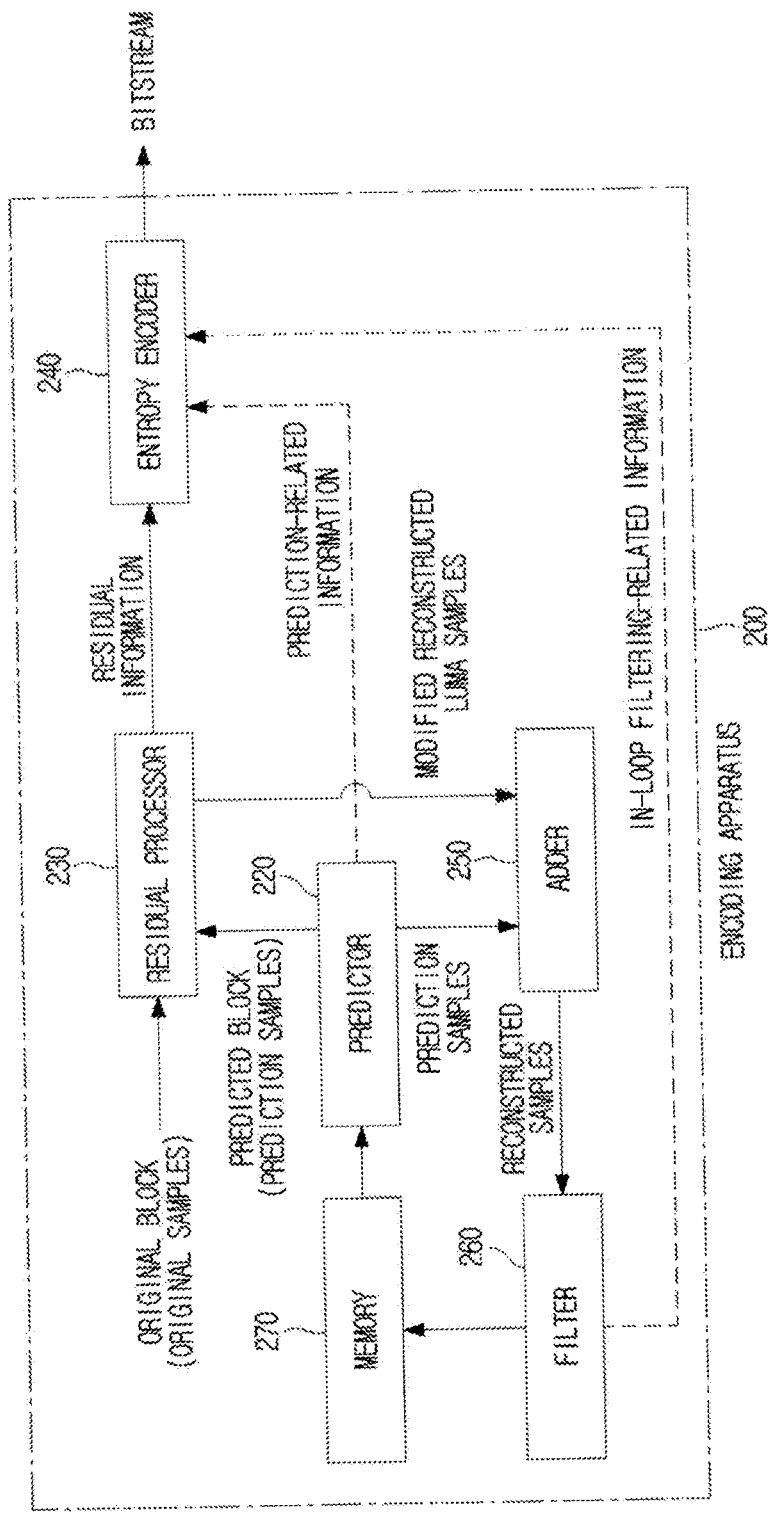

FIGS. 8 and 9 schematically illustrate examples of a video/image encoding method and related components according to embodiment(s) of the present disclosure.

Figure 10:
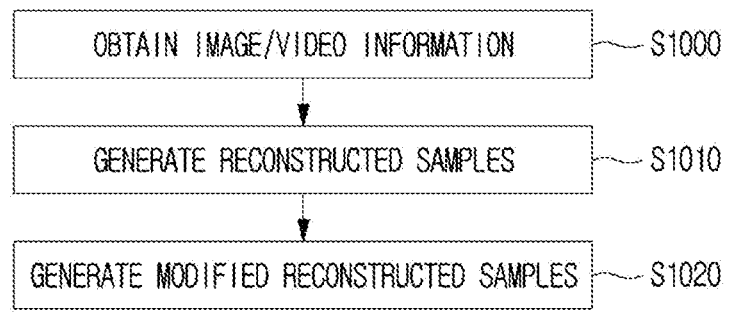
Figure 11:
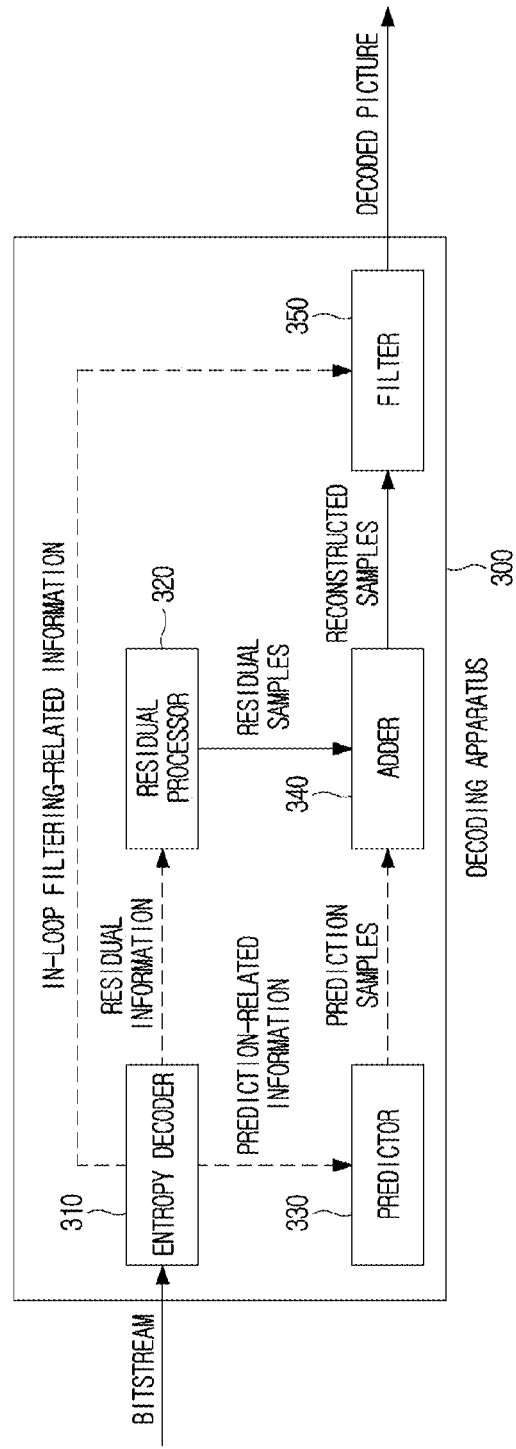

FIGS. 10 and 11 schematically illustrate examples of an image/video decoding method and related components according to an embodiment of the present disclosure.

Figure 12:
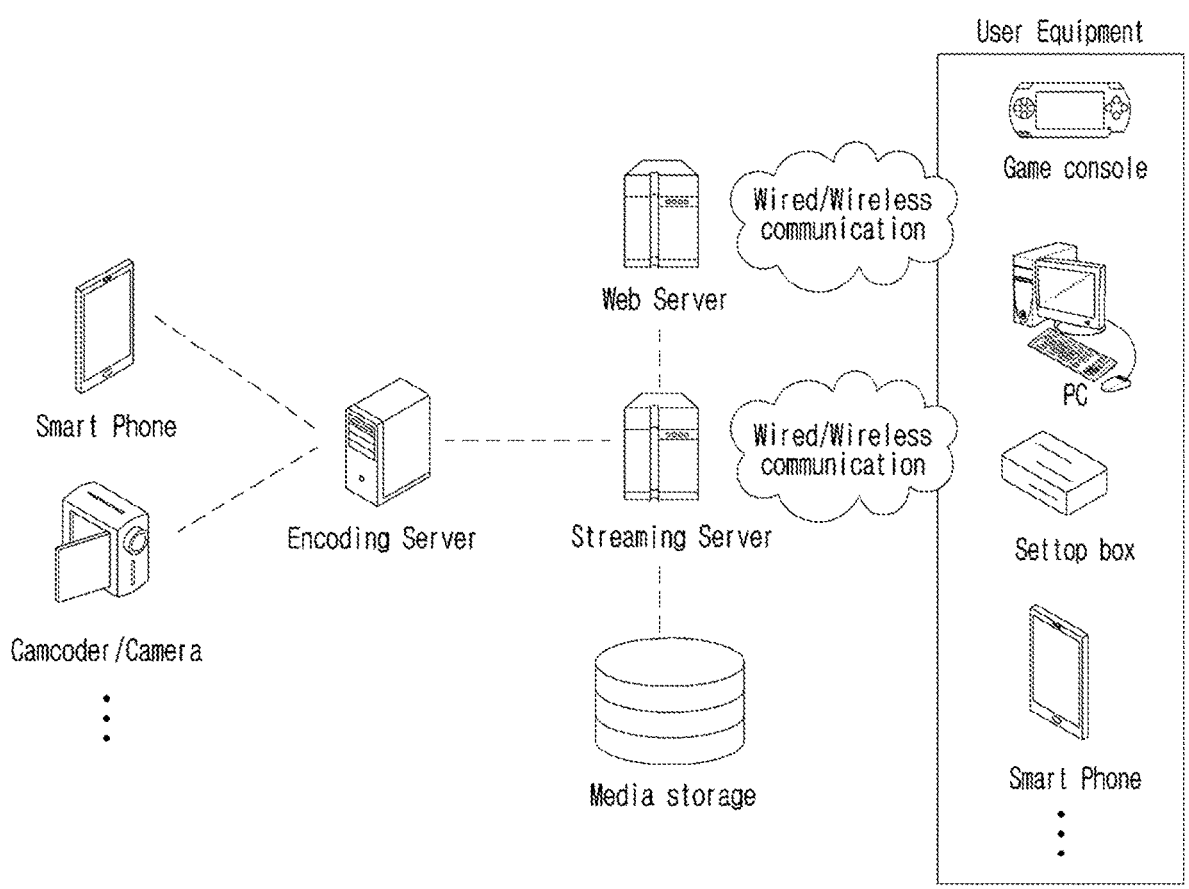

FIG. 12 illustrates an example of a content streaming system to which embodiments disclosed in the present disclosure is applicable.

BEST MODE

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs may be used for the same components on the drawings, and repeated descriptions for the same components may be omitted.

The present disclosure relates to video/image coding. For example, the method/embodiment disclosed in the present disclosure may be related to a Versatile Video Coding (VVC) standard (ITU-T Rec. H.266), a next-generation video/image coding standard after VVC, or other video coding related standards (for example, High Efficiency Video Coding (HEVC) standard (ITU-T Rec. H.265), essential video coding (EVC) standard, AVS2 standard, etc.).

In the present disclosure, a variety of embodiments relating to video/image coding may be provided, and, unless specified to the contrary, the embodiments may be combined to each other and be performed.

In the present disclosure, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may mean a pixel value in the spatial domain, or when the pixel value is transformed into the frequency domain, it may mean a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In the present disclosure, "/" and "," are interpreted as "and/or". For example, "A/B" is interpreted as "A and/or B", and "A, B" is interpreted as "A and/or B". Additionally, "A/B/C" means "at least one of A, B and/or C". Also, "A, B, C" means "at least one of A, B and/or C".

Additionally, in the present disclosure, "or" is interpreted as "and/or". For example, "A or B" may mean 1) "A" only, 2) "B" only, or 3) "A and B". In other words, "or" in the present disclosure may mean "additionally or alternatively".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "prediction (intra prediction)", it may mean that "intra prediction" is proposed as an example of "prediction". In other words, the "prediction" of the present disclosure is not limited to "intra prediction", and "intra prediction" may be proposed as an example of "prediction". In addition, when indicated as "prediction (i.e., intra prediction)", it may also mean that "intra prediction" is proposed as an example of "prediction".

Figure 1:
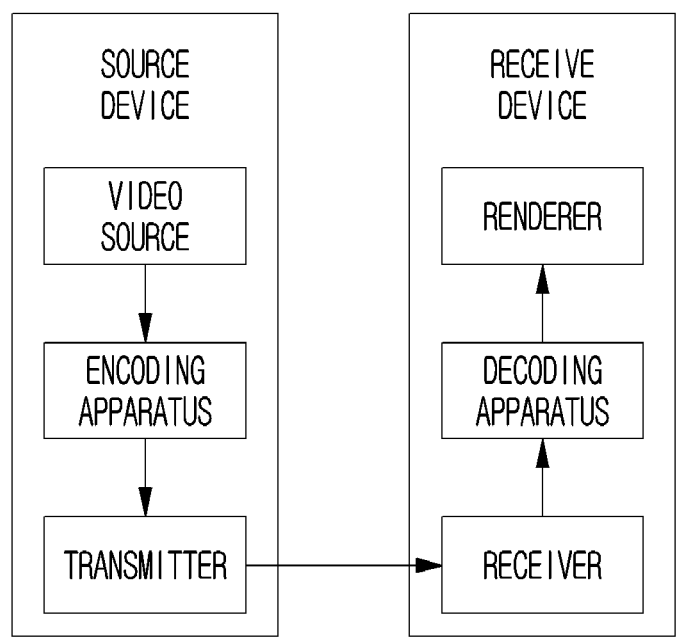

Technical features individually described in one figure in the present disclosure may be individually implemented or may be simultaneously implemented.Dfd FIG. 1 schematically illustrates an example of a video/image coding system to which embodiments of the present disclosure are applicable.

Referring to FIG. 1, the video/image coding system may include a source device and a receive device. The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded image/video information) may be output in the form of a bitstream.

The transmitter may transmit the encoded image/video information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
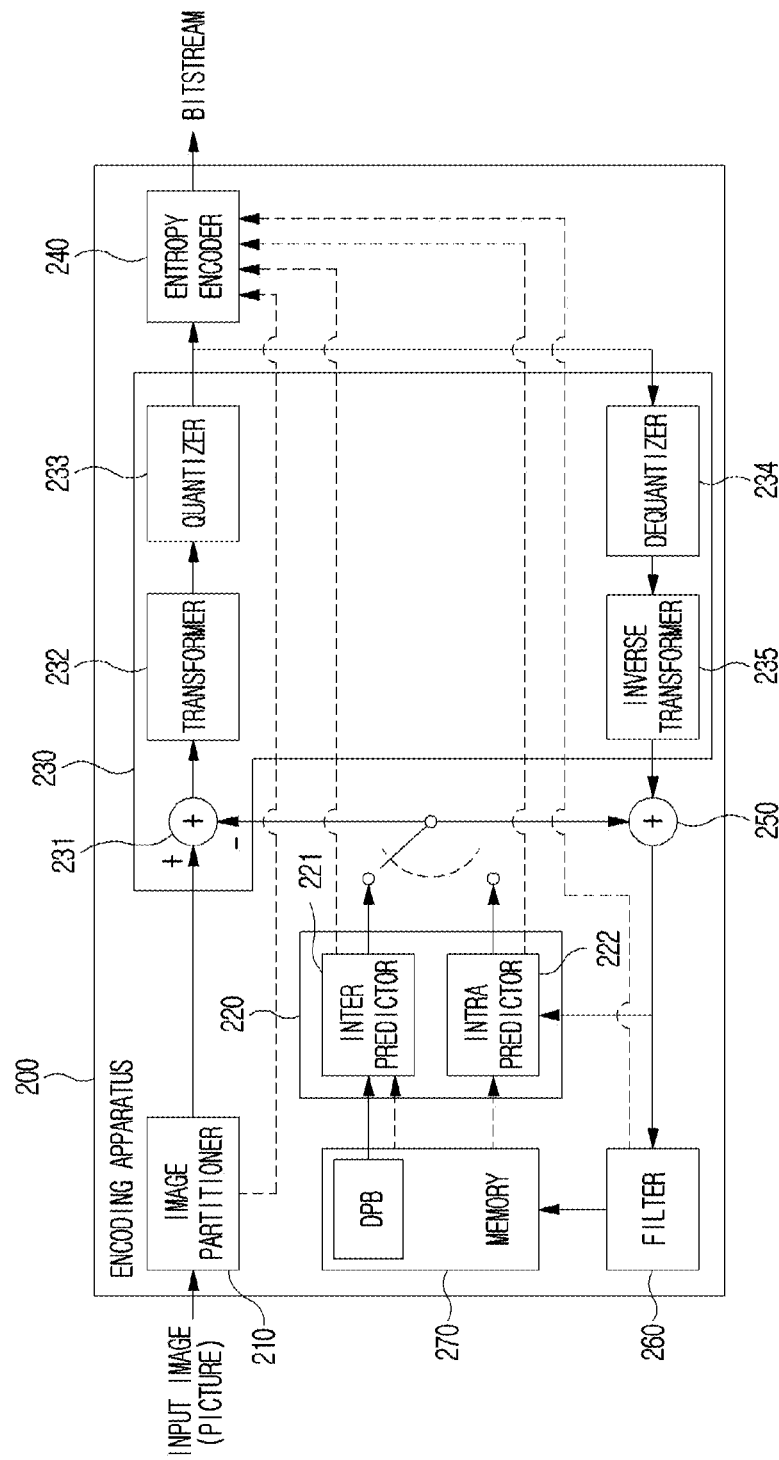
FIG. 2 is a diagram schematically illustrating a configuration of a video/image encoding apparatus to which the present disclosure is applicable.

FIG. 2 is a diagram schematically illustrating a configuration of a video/image encoding apparatus to which embodiments of the present disclosure are applicable. Hereinafter, the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor (231) may subtract the prediction signal (predicted block, prediction samples, or prediction sample array) output from the predictor 220 from the input image signal (original block, original samples, or original sample array) to generate a residual signal (residual block, residual samples, or residual sample array), and the generated residual signal is transmitted to the transformer 232. The predictor (220) may perform prediction on a processing target block (hereinafter, referred to as 'current block'), and may generate a predicted block including prediction samples for the current block. The predictor (220) may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may perform intra block copy (IBC) in order to perform prediction on a block. The IBC may be used for content image/video coding of a game or the like, such as screen content coding (SCC). Although the IBC basically performs prediction in a current picture, it may be performed similarly to inter prediction in that it derives a reference block in a current picture. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded image/video information) may be transmitted or stored on a unit basis of a network abstraction layer (NAL) in the form of a bitstream. The image/video information may further include information on various parameter sets such as an adaptation parameter set (APS), a picture parameter set (PPS), a sequence parameter set (SPS), a video parameter set (VPS) or the like. Further, the image/video information may further include general constraint information. Signaled/transmitted information and/or syntax elements described later in the present disclosure may be encoded through the above-described encoding procedure and included in the bitstream. The image/video information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 250 adds the reconstructed residual signal to a prediction signal output from the predictor 220, so that a reconstructed signal (reconstructed picture, reconstructed block, reconstructed samples, or reconstructed sample array) may be generated. When there is no residual for a processing target block as in a case where the skip mode is applied, the predicted block may be used as a reconstructed block. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset (SAO), an adaptive loop filter, a bilateral filter or the like. As discussed later in the description of each filtering method, the filter 260 may generate various information relating to filtering, and transmit the generated information to the entropy encoder 290. The information on the filtering may be encoded in the entropy encoder 290 and output in the form of a bitstream.

The modified reconstructed picture which has been transmitted to the memory 270 may be used as a reference picture in the inter predictor 280. Through this, the encoding apparatus can avoid prediction mismatch in the encoding apparatus 200 and the decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
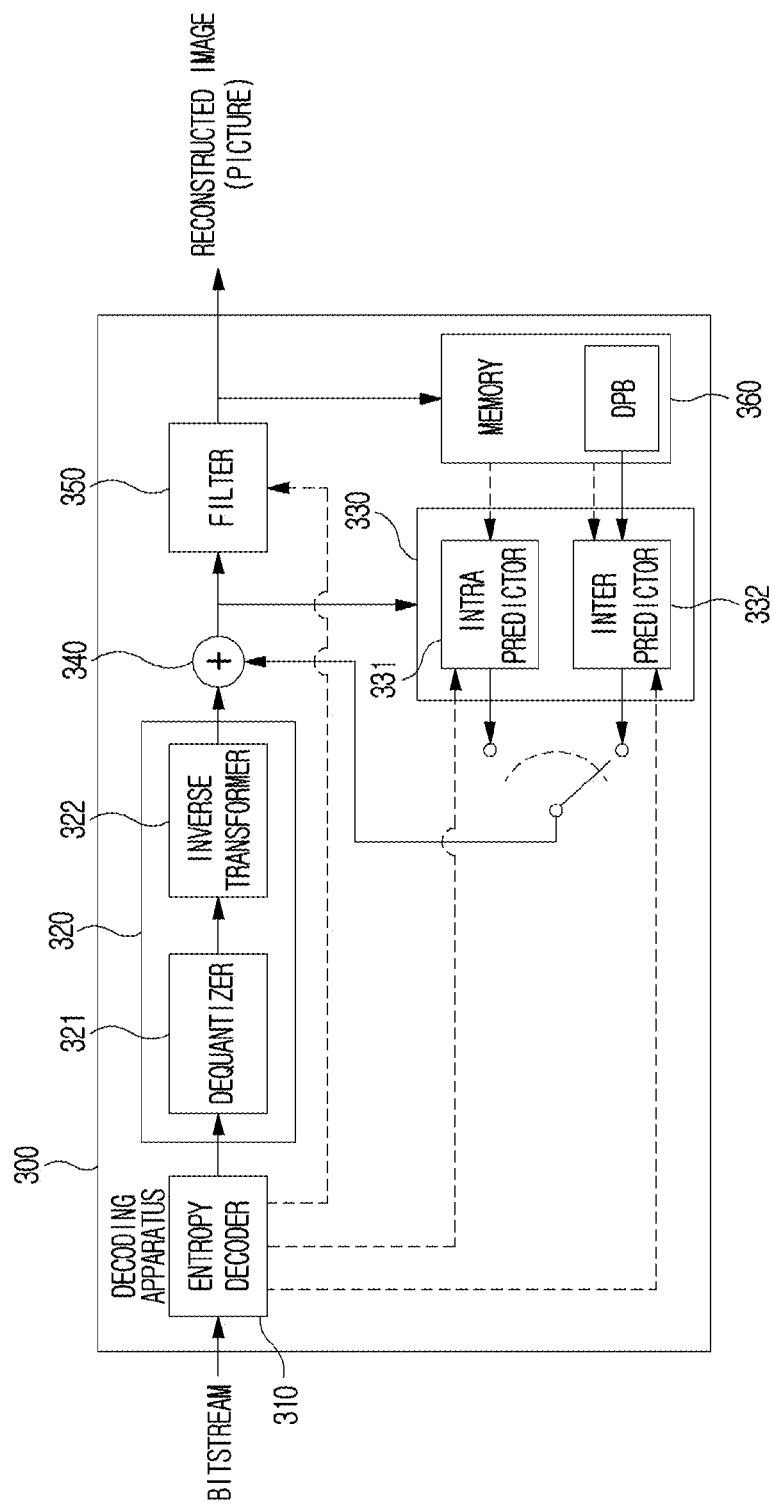
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including image/video information is input, the decoding apparatus 300 may reconstruct an image correspondingly to a process by which image/video information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor 330, and information on the residual on which entropy decoding is performed by the entropy decoder 310, that is, quantized transform coefficients and related parameter information may be input to the dequantizer 321. Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The inverse transformer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods to be described later. For example, the predictor may apply intra prediction or inter prediction for prediction on one block, and may simultaneously apply intra prediction and inter prediction. This may be called combined inter and intra prediction (CIIP). In addition, the predictor may perform intra block copy (IBC) to predict a block. The IBC may be used for image/video coding of content such as games, for example, screen content coding (SCC). Although the IBC basically performs prediction in a current picture, it can be performed similarly to inter prediction in that it derives a reference block in a current picture. That is, the IBC may use at least one of inter prediction techniques described in the present disclosure.

The intra predictor 332 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 332 may determine the prediction mode applied to the current block by using the prediction mode applied to the neighboring block.

The inter predictor 331 may derive a predicted block for the current block based on a reference block (reference sample array) specified by a motion vector on a reference picture. At this time, in order to reduce the amount of motion information transmitted in the inter prediction mode, the motion information may be predicted on a block, sub-block, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 331 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 331. The memory 360 may store motion information of a block in the current picture, from which motion information has been derived (or decoded) and/or motion information of blocks in an already reconstructed picture. The stored motion information may be transmitted to the inter predictor 331 to be utilized as motion information of a neighboring block or motion information of a temporal neighboring block. The memory 360 may store reconstructed samples of reconstructed blocks in the current picture, and transmit them to the intra predictor 332.

In the present disclosure, the embodiments described in the predictor 330, the dequantizer 321, the inverse transformer 322, and the filter 350 of the decoding apparatus 300 may be applied to the predictor 220, dequantizer 234, the inverse transformer 235, and the filter 260 of the encoding apparatus 200, respectively, in the same manner or to correspond to each other.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

In the present disclosure, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be referred to as a coefficient or a residual coefficient, or a transform coefficient for uniformity of expression.

Also, in the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through a residual coding syntax. Transform coefficients may be derived based on the residual information (or information on the transform coefficient(s)), and scaled transform coefficients may be derived through inverse transform (scaling) for the transform coefficients. Residual samples may be derived based on an inverse transform (transform) for the scaled transform coefficients. This may be applied/expressed in other parts of the present disclosure as well.

The predictor of the encoding apparatus/decoding apparatus may derive a prediction sample by performing inter prediction in units of blocks. Inter prediction may indicate a prediction of deriving in a method dependent on data elements (e.g., sample values, motion information, etc.) of picture(s) other than a current picture. When inter prediction is applied to a current block, the predicted block (prediction sample array) for the current block may be derived based on the reference block (reference sample array) specified by the motion vector on the reference picture indicated by the reference picture index. In this case, in order to reduce the amount of motion information transmitted in the inter prediction mode, the motion information of the current block may be predicted in units of blocks, subblocks, or samples based on the correlation of motion information between the neighboring block and the current block. The motion information may include a motion vector and a reference picture index. The motion information may further include inter prediction type (L0 prediction, L1 prediction, Bi prediction, etc.) information. When inter prediction is applied, the neighboring block may include a spatial neighboring block existing in the current picture and a temporal neighboring block existing in the reference picture. The reference picture including the reference block and the reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, a motion information candidate list may be constructed based on neighboring blocks of the current block, and flag or index information indicating which candidate is selected (used) to derive the motion vector and/or reference picture index of the current block may be signaled. Inter prediction may be performed based on various prediction modes. For example, in skip mode and merge mode, motion information of the current block may be the same as motion information of a selected neighboring block. In the skip mode, unlike the merge mode, a residual signal may not be transmitted. In the case of motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be referred to as L0 prediction, the prediction based on the L1 motion vector may be referred to as the L1 prediction, and the prediction based on both the L0 motion vector and the L1 motion vector may be referred to as a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures earlier than the current picture in output order as reference pictures, and the reference picture list L1 may include pictures later than the current picture in output order. The previous pictures may be referred to as a forward (reference) picture, and the subsequent pictures may be referred to as a backward (reference) picture. The reference picture list L0 may further include pictures later than the current picture in output order as reference pictures. In this case, in the reference picture list L0, the previous pictures may be indexed, and then the subsequent pictures may be indexed. The reference picture list L1 may further include pictures earlier than the current picture in output order as reference pictures. In this case, in the reference picture list 1, the subsequent pictures may be indexed, and then the previous pictures may be indexed. Here, the output order may correspond to a picture order count (POC) order.

FIG. 4 exemplarily illustrates a hierarchical structure for a coded image/video.

Referring to FIG. 4, a coded image/video is divided into a video coding layer (VCL) that handles decoding processing of an image/video and itself, a sub-system that transmits and stores coded information, and a network abstraction layer (NAL) that exists between VCL and a sub-system and is responsible for network adaptation functions.

In VCL, VCL data including compressed image data (slice data) is generated, or a parameter set including information such as a picture parameter set (PPS), a sequence parameter set (SPS), video parameter set (VPS) or a supplemental enhancement information (SEI) message additionally required for an image decoding process may be generated.

In NAL, a NAL unit may be generated by adding header information (NAL unit header) to a raw byte sequence payload (RBSP) generated in VCL. In this case, RBSP refers to slice data, a parameter set, SEI messages, etc. generated in VCL. A NAL unit header may include NAL unit type information specified according to RBSP data included in the corresponding NAL unit.

As shown in the figure, a NAL unit may be divided into a VCL NAL unit and a Non-VCL NAL unit according to RBSP generated in VCL. A VCL NAL unit may mean a NAL unit including information on an image (sliced data), and a Non-VCL NAL unit may mean a NAL unit including information necessary for decoding an image (a parameter set or SEI message).

The above-described VCL NAL unit and Non-VCL NAL unit may be transmitted through a network by attaching header information according to a data standard of a subsystem. For example, a NAL unit may be transformed into a data form of a predetermined standard such as H.266/VVC file format, Real-time Transport Protocol (RTP), Transport Stream (TS), and transmitted through various networks.

As described above, a NAL unit type of a NAL unit may be specified according to a RBSP data structure included in the corresponding NAL unit, and information on this NAL unit type may be stored in a NAL unit header and signaled.

For example, a NAL unit may be classified into a VCL NAL unit type and a Non-VCL NAL unit type according to whether or not a NAL unit includes image information (slice data). A VCL NAL unit type may be classified according to a property and a type of a picture included in a VCL NAL unit, and a Non-VCL NAL unit type may be classified according to a type of a parameter set.

The following is an example of a NAL unit type specified according to a type of a parameter set included in a Non-VCL NAL unit type.

APS (Adaptation Parameter Set) NAL unit: Type for a NAL unit including APS

DPS (Decoding Parameter Set) NAL unit: Type for a NAL unit including DPS

VPS (Video Parameter Set) NAL unit: Type of a NAL unit including VPS

SPS (Sequence Parameter Set) NAL unit: Type for a NAL unit including SPS

PPS (Picture Parameter Set) NAL unit: Type of a NAL unit including PPS

PH (Picture header) NAL unit: Type of a NAL unit including PH

The above-described NAL unit types have syntax information for a NAL unit type, and the syntax information may be stored in a NAL unit header and signaled. For example, the syntax information may be nal_unit_type, and NAL unit types may be specified by a value of nal_unit_type.

Meanwhile, as described above, one picture may include a plurality of slices, and one slice may include a slice header and slice data. In this case, one picture header may be further added for a plurality of slices (a set of slice headers and slice data) in one picture. The picture header (picture header syntax) may include information/parameters commonly applicable to the picture. In the present disclosure, a slice may be mixed or replaced with a tile group. Also, in the present disclosure, a slice header may be mixed or replaced with a tile group header.

The slice header (slice header syntax, slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In the present disclosure, a high level syntax (HLS) may include at least one of the APS syntax, the PPS syntax, the SPS syntax, the VPS syntax, the DPS syntax, the picture header syntax, or the slice header syntax.

In the present disclosure, image/video information is encoded and signaled in the form of a bitstream from an encoding apparatus to a decoding apparatus. Image/video information may include picture partitioning-related information, intra/inter prediction information, residual information, in-loop filtering information, information included in the slice header, information included in the picture header, information included in the APS, information included in the PPS, information included in the SPS, information included in the VPS, and/or information included in the DPS. In addition, the image/video information may further include information of a NAL unit header.

On the other hand, in order to compensate for the difference between the original image and the reconstructed image due to an error occurring in the compression encoding process such as quantization, an in-loop filtering procedure may be performed on the reconstructed samples or reconstructed picture as described above. As described above, the in-loop filtering may be performed by the filter of the encoding apparatus and the filter of the decoding apparatus, and a deblocking filter, SAO, and/or adaptive loop filter (ALF) may be applied. For example, the ALF procedure may be performed after the deblocking filtering procedure and/or the SAO procedure are completed. However, even in this case, the deblocking filtering procedure and/or the SAO procedure may be omitted.

Hereinafter, a detailed description of picture reconstruction and filtering will be described. In image/video coding, a reconstructed block may be generated based on intra prediction/inter prediction in units of blocks, and a reconstructed picture including the reconstructed blocks may be generated. When the current picture/slice is an I picture/slice, blocks included in the current picture/slice may be reconstructed based only on intra prediction. Meanwhile, when the current picture/slice is a P or B picture/slice, blocks included in the current picture/slice may be reconstructed based on intra prediction or inter prediction. In this case, intra prediction may be applied to some blocks in the current picture/slice, and inter prediction may be applied to the remaining blocks.

Intra prediction may indicate prediction that generates prediction samples for the current block based on reference samples in a picture to which the current block belongs (hereinafter, referred to as a current picture). When intra prediction is applied to the current block, neighboring reference samples to be used for intra prediction of the current block may be derived. The neighboring reference samples of the current block may include a total of 2*nH samples adjacent to the left boundary of the current block of nW×nH and neighboring to the bottom-left, a total of 2*nW samples adjacent to the top boundary of the current block and neighboring to the top-right, and one sample neighboring to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of nW×nH, a total of nW samples adjacent to the bottom boundary of the current block, and one sample neighboring to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be constructed through interpolation of available samples.

When neighboring reference samples are derived, a prediction sample may be derived based on an average or interpolation of neighboring reference samples of the current block, and (ii) the prediction sample may be derived based on a reference sample existing in a specific (prediction) direction with respect to the prediction sample among neighboring reference samples of the current block. The case of (i) may be referred to as a non-directional mode or a non-angular mode, and the case of (ii) may be referred to as a directional mode or an angular mode. In addition, the prediction sample may be generated through interpolation between the first neighboring sample and the second neighboring sample located in the opposite direction to the prediction direction of the intra prediction mode of the current block based on the prediction sample of the current block among the neighboring reference samples. The above-described case may be referred to as linear interpolation intra prediction (LIP). In addition, chroma prediction samples may be generated based on the luma samples using a linear model. This case may be referred to as LM mode. In addition, a temporary prediction sample of the current block may be derived based on the filtered neighboring reference samples, and a prediction sample of the current block may be derived by the weighted sum of at least one reference sample derived according to the intra prediction mode among the existing neighboring reference samples, that is, unfiltered neighboring reference samples and the temporary prediction sample. The above-described case may be referred to as position dependent intra prediction (PDPC). In addition, intra prediction encoding may be performed based on a method in which the reference sample line with the highest prediction accuracy is selected among the multiple reference sample lines surrounding the current block, the prediction sample is derived using the reference sample located in the prediction direction in the corresponding line, and the used reference sample line is indicated (signaled) to the decoding apparatus. The above-described case may be referred to as multi-reference line (MRL) intra prediction or MRL-based intra prediction. In addition, the current block is divided into vertical or horizontal sub-partitions to perform intra prediction based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using neighboring reference samples in units of the sub-partitions. This prediction method may be referred to as intra sub-partitions (ISP) or ISP-based intra prediction. The above-described intra prediction methods may be referred to as an intra prediction type to be distinguished from the intra prediction mode in Table of Contents 1.2. The intra prediction type may be referred to by various terms such as an intra prediction scheme or an additional intra prediction mode. For example, the intra prediction type (or additional intra prediction mode, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction procedure may include an intra prediction mode/type determination step, a neighboring reference sample derivation step, and an intra prediction mode/type based prediction sample derivation step. In addition, if necessary, a post-filtering step may be performed on the derived prediction sample.

A modified reconstructed picture may be generated through an in-loop filtering procedure, and the modified reconstructed picture may be output as a decoded picture in the decoding apparatus. Alternatively, it may be stored in the decoded picture buffer or the memory of the encoding apparatus/decoding apparatus to use as a reference picture in an inter prediction procedure when encoding/decoding a subsequent picture. The in-loop filtering procedure may include a deblocking filtering procedure, a sample adaptive offset (SAO) procedure, and/or an adaptive loop filter (ALF) procedure, as described above. In this case, one or a part of the deblocking filtering procedure, the sample adaptive offset (SAO) procedure, the adaptive loop filter (ALF) procedure, and the bi-lateral filter procedure may be sequentially applied, or all of them may be sequentially applied. For example, after the deblocking filtering procedure is applied to the reconstructed picture, the SAO procedure may be performed. Or, for example, after the deblocking filtering procedure is applied to the reconstructed picture, the ALF procedure may be performed. This may be performed in the encoding apparatus as well.

Deblocking filtering is a filtering technique that removes distortion generated at a boundary between blocks in a reconstructed picture. The deblocking filtering procedure may, for example, derive a target boundary from a reconstructed picture, determine a boundary strength (bS) for the target boundary, and perform deblocking filtering on the target boundary based on the bS. The bS may be determined based on a prediction mode of two blocks adjacent to the target boundary, a motion vector difference, whether a reference picture is the same, whether a non-zero significant coefficient exists, and the like.

SAO is a method of compensating for an offset difference between a reconstructed picture and an original picture in units of samples, and may be applied based on, for example, types such as a band offset and an edge offset. According to the SAO, samples may be classified into different categories according to each SAO type, and an offset value may be added to each sample based on the category. The filtering information for SAO may include information on whether SAO is applied, SAO type information, SAO offset value information, and the like. SAO may be applied to the reconstructed picture after the deblocking filtering is applied.

Adaptive Loop Filter (ALF) is a technique of filtering a reconstructed picture in units of samples based on filter coefficients according to a filter shape. The encoding apparatus may determine whether to apply ALF, an ALF shape and/or an ALF filtering coefficient, etc. through comparison of the reconstructed picture and the original picture, and may signal to the decoding apparatus. That is, the filtering information for ALF may include information on whether ALF is applied, ALF filter shape information, ALF filtering coefficient information, and the like. ALF may be applied to the reconstructed picture after the deblocking filtering is applied.

FIG. 5 exemplarily shows a picture including CTUs. In the picture of FIG. 5, rectangles separated by a dotted line may indicate CTUs, rectangles separated by a thick line may indicate a tile, and a shaded area may indicate a tile group (or slice).

In the video/image coding according to the present disclosure, an image processing unit may have a hierarchical structure. One picture may be divided into one or more tiles or tile groups (or slices). One tile group (or slice) may include one or more tiles. One tile may include one or more CTUs. The CTU may be divided into one or more CUs. A tile is a rectangular area within a picture that contains CTUs within a specific tile row and a specific tile column. The tile group may include an integer number of tiles according to the tile raster scan in the picture. The tile group header may carry information/parameters applicable to the corresponding tile group. When the encoding/decoding apparatus has a multi-core processor, the encoding/decoding procedures for the tile or tile group may be processed in parallel. Here, the tile group may have one of tile group types including an intra (I) tile group, a predictive (P) tile group, and a bi-predictive (B) tile group. For blocks in the I tile group, inter prediction is not used for prediction, and only intra prediction may be used. Of course, even in this case, the original sample value may be coded and signaled without prediction. For blocks in the P tile group, intra prediction or inter prediction may be used, and when inter prediction is used, only uni-prediction may be used. Meanwhile, intra prediction or inter prediction may be used for blocks in the B tile group, and when inter prediction is used, up to the maximum bi-prediction may be used.

The encoder may determine the tile/tile group, maximum and minimum coding unit size according to the characteristics (e.g., resolution) of the video image or in consideration of coding efficiency or parallel processing. Information on this or information that can derive this may be included in the bitstream.

The decoder may obtain information indicating whether the tile/tile group of the current picture, the CTU in the tile is divided into a plurality of coding units, and the like. If such information is obtained (transmitted) only under specific conditions, efficiency can be increased.

The tile group header (tile group header syntax, slice header, slice header syntax) may include information/parameters commonly applicable to the tile group (or slice). APS (APS syntax) or PPS (PPS syntax) may include information/parameters commonly applicable to one or more pictures. The SPS (SPS syntax) may include information/parameters commonly applicable to one or more sequences. The VPS (VPS syntax) may include information/parameters commonly applicable to the entire video. In the present disclosure, the high-level syntax may include at least one of the APS syntax, PPS syntax, SPS syntax, and VPS syntax.

Also, for example, information on the division and configuration of the tile/tile group (or slice) may be configured at the encoding end through the high-level syntax and transmitted to the decoding apparatus in the form of a bitstream.

The following table shows an exemplary syntax of an SPS according to an embodiment of the present disclosure.

TABLE 1

|  | Descriptor |
| --- | --- |
| seq_parameter_set_rbsp( ) { |  |
| ... |  |
|   subpics_present_flag | u(1) |
|   if( subpics_present_flag ) { |  |
|     sps_num_subpics_minus1 | u(8) |
|     for( i = 0; i <= sps_num_subpics_minus1; i++ ) { |  |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } |  |
|   } |  |
| ... |  |
| } |  |

The following table shows an exemplary syntax of a PPS according to an embodiment of the present disclosure.

TABLE 2

|  | Descriptor |
| --- | --- |
| pic_parameter_set_rbsp( ) { |  |
| ... |  |
|   no_pic_partition_flag | u(1) |
|   if( !no_pic_partition_flag ) { |  |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) |  |
|       tile_column_width_minus1[ i ] | ue(v) |
|     for( i = 0; i <= num_exp_tile_rows_minus1; i++ ) |  |
|       tile_row_height_minus1[ i ] | ue(v) |
|     rect_slice_flag | u(1) |
|     if( rect_slice_flag ) |  |
|       single_slice_per_subpic_flag | u(1) |
|     if( rect_slice_flag && !single_slice_per_subpic_flag ) { |  |
|       num_slices_in_pic_minus1 | ue(v) |
|       tile_idx_delta_present_flag | u(1) |
|       for( i = 0; i < num_slices_in_pic_minus1; i++ ) { |  |
|         slice_width_in_tiles_minus1[ i ] | ue(v) |

TABLE 2-continued

| | Descriptor |
|---|---|
|     slice_height_in_tiles_minus1[ i ] | ue(v) |
|     if( slice_width_in_tiles_minus1[ i ] = = 0 && | |
|         slice_height_in_tiles_minus1[ i ] = = 0 ) { | |
|       num_slices_in_tile_minus1[ i ] | ue(v) |
|       numSlicesInTileMinus1 = num_slices_in_tile_minus1[ i ] | |
|       for( j = 0; j < numSlicesInTileMinus1; j++ ) | |
|         slice_height_in_ctu_minus1[ i++ ] | ue(v) |
|     } | |
|     if( tile_idx_delta_present_flag && i < num_slices_in_pic_minus1 ) | |
|       tile_idx_delta[ i ] | se(v) |
|   } | |
| } | |
|   loop_filter_across_tiles_enabled_flag | u(1) |
|   loop_filter_across_slices_enabled_flag | u(1) |
| } | |
| ... | |
| } | |

The following table shows an exemplary syntax of a slice header according to an embodiment of the present disclosure.

TABLE 3

| | Descriptor |
|---|---|
| slice_header( ) { | |
|   ... | |
|   if( rect_slice_flag | | NumTilesInPic > 1 ) | |
|     slice_address | u(v) |
|   if( !rect_slice_flag && NumTilesInPic > 1 ) | |
|     num_tiles_in_slice_minus1 | ue(v) |
|   ... | |
| } | |

An in-loop filter, also referred to as a loop filter, may be used for decoding of a coded bitstream. Tools for loop filtering include deblocking filter, SAO, and ALF. Three flags, one for each tool, are included in the SPS to specify whether the tools are activated for coding of CLVS or CVS referring to the SPS.

Even when a loop filter is available (enabled) for coding pictures within CVS, such a loop filter may be controlled not to cross a certain boundary. Here, the specific boundary may include a subpicture boundary, a tile boundary, a slice boundary, and a virtual boundary.

The tables below are the syntax of SPS, PPS, picture header, and slice header and include syntax elements related to signaling of loop filter control.

The following table shows an example syntax of an SPS according to an embodiment of the present disclosure.

TABLE 4

| | Descriptor |
|---|---|
| seq_parameter_set_rbsp( ) { | |
|   ... | |
|   subpics_present_flag | u(1) |
|   if( subpics_present_flag ) { | |
|     sps_num_subpics_minus1 | u(8) |
|     for( i = 0; i <= sps_num_subpics_minus1; i++ ) { | |
|       subpic_ctu_top_left_x[ i ] | u(v) |
|       subpic_ctu_top_left_y[ i ] | u(v) |
|       subpic_width_minus1[ i ] | u(v) |
|       subpic_height_minus1[ i ] | u(v) |
|       subpic_treated_as_pic_flag[ i ] | u(1) |
|       loop_filter_across_subpic_enabled_flag[ i ] | u(1) |
|     } | |
|   } | |
|   ... | |
|   sps_sao_enabled_flag | u(1) |
|   sps_alf_enabled_flag | u(1) |
|   ... | |
|   sps_loop_filter_across_virtual_boundaries_disabled_present_flag | u(1) |
|   if( sps_loop_filter_across_virtual_boundaries_disabled_present_flag ) { | |
|     sps_num_ver_virtual_boundaries | u(2) |
|     for( i = 0; i < sps_num_ver_virtual_boundaries; i++ ) | |
|       sps_virtual_boundaries_pos_x[ i ] | u(13) |
|     sps_num_hor_virtual_boundaries | u(2) |
|     for( i = 0; i < sps_num_hor_virtual_boundaries; i++ ) | |
|       sps_virtual_boundaries_pos_y[ i ] | u(13) |
|   } | |
|   ... | |
| } | |

The following table shows an exemplary syntax of PPS according to an embodiment of the present disclosure.

TABLE 5

|  | Descriptor |
|---|---|
| pic_parameter_set_rbsp( ) { | |
| ... | |
| no_pic_partition_flag | u(1) |
| if( !no_pic_partition_flag ) { | |
| ... | |
| loop_filter_across_tiles_enabled_flag | u(1) |
| loop_filter_across_slices_enabled_flag | u(1) |
| } | |
| ... | |
| deblocking_filter_control_present_flag | u(1) |
| if( deblocking_filter_control_present_flag ) { | |

TABLE 5-continued

|  | Descriptor |
|---|---|
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| } | |
| } | |
| ... | |
| } | |

The following table shows an exemplary syntax of a picture header according to an embodiment of the present disclosure.

TABLE 6

|  | Descriptor |
|---|---|
| picture_header_rbsp( ) { | |
| ... | |
| if( !sps_loop_filter_across_virtual_boundaries_disabled_present_flag ) { | |
| ph_loop_filter_across_virtual_boundaries_disabled_present_flag | u(1) |
| if( ph_loop_filter_across_virtual_boundaries_disabled_present_flag ) { | |
| ph_num_ver_virtual_boundaries | u(2) |
| for( i = 0; i < ph_num_ver_virtual_boundaries; i++ ) | |
| ph_virtual_boundaries_pos_x[ i ] | u(13) |
| ph_num_hor_virtual_boundaries | u(2) |
| for( i = 0; i < ph_num_hor_virtual_boundaries; i++ ) | |
| ph_virtual_boundaries_pos_y[ i ] | u(13) |
| } | |
| } | |
| ... | |
| if( sps_sao_enabled_flag ) { | |
| pic_sao_enabled_present_flag | u(1) |
| if( pic_sao_enabled_present_flag ) { | |
| pic_sao_luma_enabled_flag | u(1) |
| if(ChromaArrayType != 0 ) | |
| pic_sao_chroma_enabled_flag | u(1) |
| } | |
| } | |
| if( sps_alf_enabled_flag ) { | |
| pic_alf_enabled_present_flag | u(1) |
| if( pic_alf_enabled_present_flag ) { | |
| pic_alf_enabled_flag | u(1) |
| if( pic_alf_enabled_flag ) { | |
| pic_num_alf_aps_ids_luma | u(3) |
| for( i = 0; i < pic_num_alf_aps_ids_luma; i++ ) | |
| pic_alf_aps_id_luma[ i ] | u(3) |
| if( ChromaArrayType != 0 ) | |
| pic_alf_chroma_idc | u(2) |
| if( pic_alf_chroma_idc ) | |
| pic_alf_aps_id_chroma | u(3) |
| } | |
| } | |
| } | |
| ... | |
| if( deblocking_filter_override_enabled_flag ) { | |
| pic_deblocking_filter_override_present_flag | u(1) |
| if( pic_deblocking_filter_override_present_flag ) { | |
| pic_deblocking_filter_override_flag | u(1) |
| if( pic_deblocking_filter_override_flag ) { | |
| pic_deblocking_filter_disabled_flag | u(1) |
| if( !pic_deblocking_filter_disabled_flag ) { | |
| pic_beta_offset_div2 | se(v) |
| pic_tc_offset_div2 | se(v) |
| } | |
| } | |
| } | |
| } | |
| ... | |
| } | |

The following table shows an exemplary syntax of a slice header according to an embodiment of the present disclosure.

TABLE 7

| | Descriptor |
|---|---|
| slice_header( ) { | |
| ... | |
|   if( pps_cu_chroma_qp_offset_list_enabled_flag ) | |
|     cu_chroma_qp_offset_enabled_flag | u(1) |
|   if( sps_sao_enabled_flag && !pic_sao_enabled_present_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag && !pic_alf_enabled_present_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|   } | |
|   if( deblocking_filter_override_enabled_flag && | |
|       !pic_deblocking_filter_override_present_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|     } | |
|   } | |
| ... | |
| } | |

FIG. 6 is a flowchart illustrating a filtering-based encoding method in an encoding apparatus. The method of FIG. 6 may include steps S600 to S630.

In step S600, the encoding apparatus may generate a reconstructed picture. Step S600 may be performed based on the above-described reconstructed picture (or reconstructed samples) generating procedure.

In step S610, the encoding apparatus may apply in-loop filtering to the reconstructed samples in the reconstructed picture. Here, the in-loop filtering may include at least one of the above-described deblocking filtering, SAO, or ALF.

In step S620, the encoding apparatus may generate information on in-loop filtering (in-loop filtering-related information) based on the in-loop filtering procedure.

In operation S630, the encoding apparatus may encode image/video information including prediction-related information, residual-related information, and/or in-loop filtering-related information.

FIG. 7 is a flowchart for explaining a filtering-based decoding method in a decoding apparatus. The method of FIG. 7 may include steps S700 to S720.

In step S700, the decoding apparatus may obtain image/video information including prediction-related information, residual-related information, and/or in-loop filtering-related information from the bitstream. Here, the bitstream may be based on encoded image/video information transmitted from the encoding apparatus.

In step S710, the decoding apparatus may generate a reconstructed picture. Step S710 may be performed based on the above-described reconstructed picture (or reconstructed samples) generation procedure.

In step S720, the decoding apparatus may apply in-loop filtering to the reconstructed samples in the reconstructed picture. Here, the in-loop filtering may include at least one of the above-described deblocking filtering, SAO, or ALF.

Here, the in-loop filtering-related information may include information/syntax elements included in the tables. The in-loop filtering-related information may include information on whether a loop filter (in-loop filter) is available for a slice/tile. For example, the in-loop filtering-related information may include loop_filter_across_slices_in_tile_enabled_flag, loop_filter_across_subpic_tiles_enabled_flag, loop_filter_across_tiles_slices_enabled_flag, loop_filter_across_tiles_in_subpic_enabled_flag, and/or loop_slices_across_enabled_flag_subpic_across_flag. A loop filter (in-loop filter) across slices/tiles may or may not be available based on in-loop filtering-related information. For example, in the case of deblocking filtering, if the loop filter (in-loop filter) is not available on the tile (or slice) and the target boundary to be deblocking filtered is the boundary of the tile (or slice), the deblocking filtering is not applied to the target boundary. For example, in the case of SAO, if the loop filter (in-loop filter) is not available on the tile (or slice) and the reference sample used for the edge offset of SAO (specifically used to derive the edge index (edgeIdx)) is contained in a different tile (slice) from the current tile (slice) containing the target sample, the edge offset is not applied to the target sample. For example, in the case of ALF, if no loop filter (in-loop filter) is available on the tile (or slice) and the reference sample used for ALF (specifically at the filter coefficient position in the shape of the filter)

is a different tile (different slice), clipping is applied to the position of the reference sample in the current tile (slice) containing the target sample.

Prediction-related information may include prediction mode information (e.g., mpm flag, mpm index, merge flag, merge subblock flag, inter affine flag, etc.) and/or motion information index (e.g., merge index, mvp flag(index), merge subblock index, etc.). For example, a motion information candidate list (e.g., a merge candidate list, an mvp candidate list, a merge subblock candidate list, etc.) may be constructed according to the prediction mode of the current block, and One of candidates in the motion information candidate list is denoted/selected using the motion information index. The video/image information may further include the above-described subpicture-related information. A subpicture of a picture may be specified based on the subpicture-related information. The video/image information may further include the above-described slice-related information. A slice of a picture may be specified based on slice-related information. The video/image information may further include the above-described tile-related information. A tile of a picture may be specified based on tile-related information.

For example, the decoder may perform prediction to derive prediction samples based on prediction-related information. The decoder may derive residual samples based on the residual-related information. The decoder may generate reconstructed samples (or reconstructed picture) based on the prediction samples and the residual samples.

The encoder may also generate a reconstructed picture. The encoder may derive prediction samples and generate prediction-related information. The encoder may derive residual samples based on the prediction samples. The encoder may generate residual-related information based on the residual samples. The encoder may derive modified residual samples based on the residual samples. For example, the encoder may perform a transform process and a quantization process on the residual samples, and then perform an dequantization process and an inverse transform process in order to derive the modified residual samples. The encoder may generate reconstructed samples (or reconstructed picture) based on the prediction sample and the (modified) residual samples.

Hereinafter, high-level syntax signaling and semantics according to embodiments of the present disclosure will be described.

An embodiment of the present disclosure may include a method of controlling loop filters. This method of controlling loop filters may be applied to a reconstructed picture. In-loop filters (loop filters) may be used for decoding of encoded bitstreams. The loop filters may include the above-described deblocking filter (DF), SAO, ALF. The SPS may include flags related to each of the deblocking filter, SAO, ALF. The flags may indicate whether each tool is available for coding of a coded layer video sequence (CLVS) or a coded video sequence (CVS) referring to the SPS.

When the loop filters are available for CVS, the application of the loop filters may be controlled not to cross certain boundaries. For example, whether the loop filters cross subpicture boundaries may be controlled. Also, whether the loop filters cross tile boundaries may be controlled. In addition, whether the loop filters cross virtual boundaries may be controlled. Here, virtual boundaries may be defined on CTUs based on the availability of a line buffer.

Regarding whether the in-loop filtering procedure is performed across a virtual boundary, in-loop filtering related information may include at least one of an SPS virtual boundary available flag (virtual boundary available flag in SPS), an SPS virtual boundary present flag, a picture header virtual boundary present flag, an SPS picture header virtual boundary present flag, information on a location of a virtual boundary.

In embodiments included in the present disclosure, the information on the location of the virtual boundary may include information on the x-coordinate of the vertical virtual boundary and/or information on the y-coordinate of the horizontal virtual boundary. Specifically, the information on the location of the virtual boundary may include information on the x-coordinate of the vertical virtual boundary and/or the y-coordinate of the horizontal virtual boundary in units of luma samples. In addition, the information on the location of the virtual boundary may include information on the number of information (syntax elements) on the x-coordinate of the vertical virtual boundary present in the SPS. Also, the information on the location of the virtual boundary may include information on the number of information (syntax elements) on the y-coordinate of the horizontal virtual boundary present in the SPS. Alternatively, the information on the location of the virtual boundary may include information on the number of information (syntax elements) on the x-coordinate of the vertical virtual boundary present in the picture header. Also, the information on the location of the virtual boundary may include information on the number of information (syntax elements) on the y-coordinate of the horizontal virtual boundary present in the picture header.

In the existing embodiment, the slice boundary loop filter available flag (e.g., loop_filter_across_slices_enabled_flag) is not for a specific slice, but instead is signaled for all slices in the picture referring to the PPS. Slices may be a set of one or more tiles or a set of one or more CTU rows within a tile. When a slice is a set of tiles, the slice boundary loop filter available flag has no role anymore because it may conflict with a tile boundary loop filter available flag (e.g., loop_filter_across_tiles_enabled_flag).

In addition, if the tile boundary loop filter available flag moves from PPS to SPS and is signaled for each subpicture, since slices of a tile may belong to two different subpictures, the value of a tile boundary loop filter available flag for two subpictures needs to be different.

Also, loop filter control for raster scan slices may not be possible because subpictures are applied only to rectangular slices.

Problems according to the above-described existing embodiments may be solved by the following embodiments.

According to an embodiment of the present disclosure, the signaling of the slice boundary loop filter available flag (e.g., loop_filter_across_slices_enabled_flag) may be changed from for all slices in the picture referring to the PPS to for rectangular slices in one tile.

According to an embodiment of the present disclosure, a flag indicating whether loop filters are available across tiles in a subpicture may be signaled for each subpicture. The flag may be referred to as loop_filter_across_subpic_tiles_enabled_flag[i]. In one example, if two or more subpictures share one or more slices or one or more CTUs belonging to the same tile, the value of loop_filter_across_subpic_tiles_enabled_flag[i] of all of these subpictures may be the same.

According to an embodiment of the present disclosure, loop_filter_across_subpic_tiles_enabled_flag[i] may be signaled in the PPS. Accordingly, signaling regarding the number of subpictures in the PPS may always be present.

According to an embodiment of the present disclosure, instead of different signaling of a loop filter across tiles and slices, one flag may be signaled for each subpicture to indicate whether a loop filter is available across tiles and/or slices in a subpicture.

According to an embodiment of the present disclosure, each of the flags indicating whether the loop filter crosses tiles and slices may be signaled for each subpicture rather than the whole picture, and each flag may control only tiles and slices in each subpicture.

According to an embodiment of the present disclosure, each of the flags indicating whether the loop filter crosses tiles and slices may move from PPS to SPS and may be combined into one flag. Also, the flag may control only whether the loop filter can cross tile and slice boundaries within a subpicture. That is, as to whether the loop filter can cross the boundary, tile and slice boundaries that coincide with the subpicture boundary are not included. Whether the loop filter can cross tile and slice boundaries that coincide with the subpicture boundary may not be controlled by the flag.

According to an embodiment of the present disclosure, the slice boundary loop filter available flag (e.g., loop_filter_across_slices_enabled_flag) and the tile boundary loop filter available flag (e.g., loop_filter_across_tiles_enabled_flag) may be combined/combined into one flag. The combined flag may be referred to as a tile slice boundary loop filter available flag (e.g., loop_filter_across_tiles_slices_enabled_flag).

According to an embodiment of the present disclosure, the tile slice boundary loop filter available flag (e.g., loop_filter_across_tiles_slices_enabled_flag) may be signaled in the PPS and may be present only when a picture partition is applied (e.g., when the value of no_pic_partition_flag is 0).

According to an embodiment of the present disclosure, the value of the tile slice boundary loop filter available flag (e.g., loop_filter_across_tiles_slices_enabled_flag) may be the same in all PPSs referring to the same SPS.

According to an embodiment of the present disclosure, the tile slice boundary loop filter available flag (e.g., loop_filter_across_tiles_slices_enabled_flag) may control only tile boundaries and slice boundaries that do not coincide with subpicture boundaries.

The following table shows exemplary syntax of a picture parameter set (PPS) according to an embodiment of the present disclosure.

TABLE 8

| | Descriptor |
|---|---|
| pic_parameter_set_rbsp( ) { | |
| ... | |
|   pps_num_subpics_minus1 | ue(v) |
|   subpic_id_mapping_in_pps_flag | u(1) |
|   if( subpic_id_mapping_in_pps_flag ) { | |
|     pps_subpic_id_len_minus1 | ue(v) |
|     for( i = 0; i <= pps_num_subpic_minus1; i++ ) | |
|       pps_subpic_id[ i ] | u(v) |
|   } | |
| ... | |
|   no_pic_partition_flag | u(1) |
|   if( !no_pic_partition_flag ) { | |
|     ... | |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && ( tile_idx_delta_present_flag \|\| | |
|           SliceTopLeftTileIdx[ i ] % NumTileColumns = = 0 ) ) | |
|           slice_height_in_tiles_minus1[ i ] | ue(v) |
|         if( slice_width_in_tiles_minus1[ i ] = = 0 && | |
|           slice_height_in_tiles_minus1[ i ] == 0 && | |
|           RowHeight[ SliceTopLeftTileIdx[ i ] / NumTileColumns ] > 1 ) { | |
|           num_exp_slices_in_tile[ i ] | ue(v) |
|           for( j = 0; j < num_exp_slices_in_tile[ i ]; j++ ) | |
|             exp_slice_height_in_ctus_minus1[ i ][ j ] | ue(v) |
|           if( NumSlicesInTiles[ i ] > 1 ) | |
|             loop_filter_across_slices_in_tile_enabled_flag[ i ] | u(1) |
|           i += NumSlicesInTile[ i ] - 1 | |
|         } | |
|         if( tile_idx_delta_present_flag && i < num_slices_in_pic_minus1 ) | |
|           tile_idx_delta[ i ] | se(v) |
|       } | |
|     } | |
|     for( i = 0; i <= pps_num_subpics_minus1; i++ ) | |
|       loop_filter_across_subpic_tiles_enabled_flag[ i ] | u(1) |
|   } | |
|   ... | |
| } | |

The following table shows exemplary semantics for describing syntax elements included in the syntax of the table.

TABLE 9 exp_slice_height_in_ctus_minus1[ i ][ j ] plus 1 specifies the height of the j-th rectangular slice in the tile containing the i-th slice in units of CTU rows. The value of exp_slice_height_in_ctus_minus1[ i ][ j ] shall be in the range of 0 to RowHeight[ SliceTopLeftTileIdx[ i ] / NumTileColumns ] − 1, inclusive.
loop_filter_across_slices_in_tile_enabled_flag[ i ] equal to 1 specifies that in-loop filtering operations may be performed across slice boundaries in the i-th tile of the pictures referring to the PPS. Herein slice boundaries within a subpicture do not includes slice boundaries that are also the boundaries of the subpicture.
loop_filter_across_slices_in_tile_enabled_flag equal to 0 specifies that in-loop filtering operations are not performed across slice boundaries in the i-th tile of the pictures referring to the PPS. The in-loop filtering operations include the deblocking filter, sample adaptive offset filter, and adaptive loop filter operations.
tile_idx_delta[ i ] specifies the difference between the tile index of the tile containing the first CTU in the ( i + 1 )-th rectangular slice and the tile index of the tile containing the first CTU in the i-th rectangular slice. The value of tile_idx_delta[ i ] shall be in the range of −NumTilesInPic + 1 to NumTilesInPic − 1, inclusive. When not present, the value of tile_idx_delta[ i ] is inferred to be equal to 0. When present, the value of tile_idx_delta[ i ] shall not be equal to 0.
loop_filter_across_subpic_tiles_enabled_flag[ i ] equal to 1 specifies that in-loop filtering operations may be performed across tile boundaries within the i-th subpicture in each coded picture in the CLVS. Herein tile boundaries within a subpicture do not includes tile boundaries that are also the boundaries of the subpicture.
loop_filter_across_subpic_tiles_enabled_flag[ i ] equal to 0 specifies that in-loop filtering operations are not performed across tile boundaries within the i-th subpicture in each coded picture in the CLVS. The in-loop filtering operations include the deblocking filter, sample adaptive offset filter, and adaptive loop filter operations. When there is no tile boundaries within the i-th subpicture, the value of loop_filter_across_subpic_tiles_enabled_flag[ i ] is ignored.
It is a constraint of conformance bitstream that for any two subpictures that contain one or more slices that belong to the same tile, the value of loop_filter_across_subpic_tiles_enabled_flag[ i ] of the subpictures shall be the same.

The following table shows exemplary syntax of a sequence parameter set (SPS) according to an embodiment of the present disclosure. The tile boundary loop filter available flag and/or the slice boundary loop filter available flag may not be present in the PPS according to the present embodiment.

TABLE 10

| | Descriptor |
|---|---|
| seq_parameter_set_rbsp( ) { | |
| ... | |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_ minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     ... | |
|   } | |
|   for( i = 0; i <= sps_num_subpics_minus1; i++ ) | |
|     loop_filter_across_tiles_slices_enabled_flag[ i ] | u(1) |
|     ... | |
| } | |

The following table shows exemplary semantics for describing syntax elements included in the syntax of the table.

TABLE 11 loop_filter_across_tiles_slices_enabled_flag[ i ] equal to 1 specifies that in-loop filtering operations may be performed across tile boundaries and slice boundaries within the i-th subpicture in each coded picture in the CLVS. Herein tile boundaries and slice boundaries within a subpicture do not includes tile boundaries and slice boundaries, respectively, that are also the boundaries of the subpicture.
loop_filter_across_tiles_slices_enabled_flag[ i ] equal to 0 specifies that in-loop filtering operations are not performed across tile boundaries and slice boundaries within the i-th subpicture in each coded picture in the CLVS. The in-loop filtering operations include the deblocking filter, sample adaptive offset filter, and adaptive loop filter operations. When there is no tile boundaries and/or no slices boundaries within the i-th subpicture, the value of loop_filter_across_tiles_slices_enabled_flag[ i ] is ignored
It is a constraint of conformance bitstream that for any two subpictures that contain one or more slices that belong to the same tile, the value of loop_filter_across_tiles_slices_enabled_flag[ i ] of the subpictures shall be the same.

The following table shows an exemplary syntax of the SPS according to an embodiment of the present disclosure. The tile boundary loop filter available flag and/or the slice boundary loop filter available flag may not be present in the PPS according to the present embodiment.

TABLE 12

|  | Descriptor |
|---|---|
| seq_parameter_set_rbsp( ) { | |
| ... | |
|   subpic_info_present_flag | u(1) |
|   if( subpic_info_present_flag ) { | |
|     sps_num_subpics_minus1 | ue(v) |
|     sps_independent_subpics_flag | u(1) |
|     for( i = 0; sps_num_subpics_minus1 > 0 && i <= sps_num_subpics_minus1; i++ ) { | |
|       if( i > 0 && pic_width_max_in_luma_samples > CtbSizeY ) | |
|         subpic_ctu_top_left_x[ i ] | u(v) |
|       if( i > 0 && pic_height_max_in_luma_samples > CtbSizeY ) { | |
|         subpic_ctu_top_left_y[ i ] | u(v) |
|       if( i < sps_num_subpics_minus1 && | |
|         pic_width_max_in_luma_samples > CtbSizeY ) | |
|         subpic_width_minus1[ i ] | u(v) |
|       if( i < sps_num_subpics_minus1 && | |
|         pic_height_max_in_luma_samples > CtbSizeY ) | |
|         subpic_height_minus1[ i ] | u(v) |
|       if( !sps_independent_subpics_flag) { | |
|         subpic_treated_as_pic_flag[ i ] | u(1) |
|         loop_filter_across_subpic_enabled_flag[ i ] | u(1) |
|       } | |
|     } | |
|     ... | |
|   } | |
|   for( i = 0; i <= sps_num_subpics_minus1; i++ ) { | |
|     loop_filter_across_tiles_enabled_flag[ i ] | u(1) |
|     loop_filter_across_slices_enabled_flag[ i ] | u(1) |
|   } | |
|   ... | |
| } | |

The following table shows exemplary semantics for describing syntax elements included in the syntax of the table.

TABLE 13 loop_filter_across_tiles_enabled_flag[ i ] equal to 1 specifies that in-loop filtering operations may be performed across tile boundaries within the i-th subpicture in each coded picture in the CLVS. Herein tile boundaries within a subpicture do not includes tile boundaries that are also the boundaries of the subpicture.
loop_filter_across_tiles_enabled_flag[ i ] equal to 0 specifies that in-loop filtering operations are not performed across tile boundaries within the i-th subpicture in each coded picture in the CLVS. The in-loop filtering operations include the deblocking filter, sample adaptive offset filter, and adaptive loop filter operations. When there is no tile boundaries within the i-th subpicture, the value of loop_filter_across_tiles_enabled_flag[ i ] is ignored.

TABLE 13-continued

It is a constriant of conformance bitstream that for any two subpictures that contain one or more slices that belong to the same tile, the value of loop_filter_across_tiles_enabled_flag[ i ] of the subpictures shall be the same
loop_filter_across_slices_enabled_flag[ i ] equal to 1 specifies that in-loop filtering operations may be performed across slice boundaries within the i-th subpicture in each coded picture in the CLVS. Herein slice boundaries within a subpicture do not includes slice boundaries that are also the boundaries of the subpicture.
loop_filler_across_slices_enabled_flag[ i ] equal to 0 specifies that in-loop filtering operations are not performed across slice boundaries within the i-th subpicture in each coded picture in the CLVS. The in-loop filtering operations include the deblocking filter, sample adaptive offset filter, and adaptive loop filter operations. When there is no slice boundaries within the i-th subpicture, the value of loop_filter_across_slices_enabled_flag[ i ] is ignored.

The following table shows exemplary syntax of the SPS according to the present embodiment. The tile boundary loop filter available flag and/or the slice boundary loop filter available flag may not be present in the PPS according to the present embodiment.

TABLE 14

|  | Descriptor |
| --- | --- |
| seq_parameter_set_rbsp( ) { | |
| ... | |
| loop_filter_across_tiles_slices_enabled_flag | u(1) |
| ... | |
| } | |

The following table shows exemplary semantics for describing syntax elements included in the syntax of the table.

TABLE 15 loop_filter_across_tiles_slices_enabled_flag equal to 1 specifies that in-loop filtering operations may be performed across tile boundaries and slice boundaries within any subpicture in each coded picture in the CLVS. Herein tile boundaries and slice boundaries within a subpicture do not includes tile boundaries and slice boundaries, respectively, that are also the boundaries of the subpicture.
loop_filter_across_tiles_slices_enabled_flag equal to 0 specifies that in-loop filtering operations are not performed across tile boundaries and slice boundaries within any subpicture in each coded picture in the CLVS. The in-loop filtering operations include the deblocking filter, sample adaptive offset filter, and adaptive loop filter operations. When there is no tile boundaries and/or no slices boundaries within picture/subpicture, the value of loop_filler_across_tiles_slices_enabled_flag[ i ] is ignored.

The following table shows an exemplary syntax of the PPS according to the present embodiment.

TABLE 16

|  | Descriptor |
| --- | --- |
| pic_parameter_set_rbsp( ) { | |
| ... | |
| no_pic_partition_flag | u(1) |
| if( !no_pic_partition_flag ) { | |
| ... | |
| /*Tiles and slices related signalling*/ | |
| ... | |
| loop_filter_across_tiles_slices_enabled_flag | u(1) |
| } | |
| ... | |
| } | |

The following table shows exemplary semantics for describing syntax elements included in the syntax of the table.

TABLE 17 loop_filter_across_tiles_slices_enabled_flag equal to 1 specifies that in-loop filtering operations may be performed across tile boundaries and slice boundaries within any subpicture in each coded picture in the CLVS. Herein tile boundaries and slice boundaries within a subpicture do not includes tile boundaries and slice boundaries, respectively, that are also the boundaries of the subpicture.
loop_filter_across_tiles_slices_enabled_flag equal to 0 specifies that in-loop filtering operations are not performed across tile boundaries and slice boundaries within any subpicture in each coded picture in the CLVS. The in-loop filtering operations include the deblocking filter, sample adaptive offset filter, and adaptive loop filter operations. When there is no tile boundaries and/or no slices boundaries within picture/subpicture, the value of loop_filter_across_tiles_slices_enabled_flag[ i ] is ignored.

TABLE 17-continued

It is a constraint of conformance bitstream that the value of loop_filter_across_tiles_slices_enabled_flag shall be the same in all PPS in a CLVS.

According to embodiments of the present disclosure together with the above tables, information for performing in-loop filtering across virtual boundaries may be efficiently signaled. For example, in-loop filtering may be performed based on signaling of information related to whether in-loop filtering across specific boundaries (e.g., subpicture boundaries, slice boundaries, tile boundaries, etc.) is available.

FIGS. 8 and 9 schematically illustrate an example of a video/image encoding method and related components according to embodiment(s) of the present disclosure.

The method disclosed in FIG. 8 may be performed by the encoding apparatus disclosed in FIG. 2 or FIG. 9. Specifically, for example, S800 and S810 of FIG. 8 may be performed by the residual processor 230 of the encoding apparatus of FIG. 9, S820 of FIG. 8 may be performed by the filter 260 of the encoding apparatus of FIG. 9, and S830 of FIG. 8 may be performed by the entropy encoder 240 of the encoding apparatus of FIG. 9. In addition, although not shown in FIG. 8, prediction samples or prediction-related information may be derived by the predictor 220 of the encoding apparatus in FIG. 8, and a bitstream may be generated from residual information or prediction-related information by the entropy encoder 240 of the encoding apparatus. The method disclosed in FIG. 8 may include the embodiments described above in the present disclosure.

Referring to FIG. 8, the encoding apparatus may derive residual samples (S800). The encoding apparatus may derive residual samples for the current block, and the residual samples for the current block may be derived based on original samples and prediction samples of the current block. Specifically, the encoding apparatus may derive prediction samples of the current block based on the prediction mode. In this case, various prediction methods disclosed in the present disclosure, such as inter prediction or intra prediction, may be applied. Residual samples may be derived based on the prediction samples and the original samples.

The encoding apparatus may derive transform coefficients. The encoding apparatus may derive transform coefficients based on a transform procedure for the residual samples. For example, the transform procedure may include at least one of DCT, DST, GBT, or CNT.

The encoding apparatus may derive quantized transform coefficients. The encoding apparatus may derive quantized transform coefficients based on a quantization procedure for the transform coefficients. The quantized transform coefficients may have a one-dimensional vector form based on a coefficient scan order.

The encoding apparatus may generate residual information (S810). The encoding apparatus may generate residual information based on the residual samples of the current block. The encoding apparatus may generate residual information representing the quantized transform coefficients. The residual information may be generated through various encoding methods such as exponential Golomb, CAVLC, CABAC, and the like.

The encoding apparatus may generate reconstructed samples. The encoding apparatus may generate reconstructed samples based on the residual information. Reconstructed samples may be generated by adding residual samples based on residual information to prediction samples. Specifically, the encoding apparatus may perform prediction (intra or inter prediction) on the current block and generate reconstructed samples based on original samples and prediction samples generated from prediction.

The reconstructed samples may include reconstructed luma samples and reconstructed chroma samples. Specifically, the residual samples may include residual luma samples and residual chroma samples. The residual luma samples may be generated based on the original luma samples and the predicted luma samples. The residual chroma samples may be generated based on the original chroma samples and the predicted chroma samples. The encoding apparatus may derive transform coefficients (luma transform coefficients) for the residual luma samples and/or transform coefficients (chroma transform coefficients) for the residual chroma samples. The quantized transform coefficients may include quantized luma transform coefficients and/or quantized chroma transform coefficients.

The encoding apparatus may generate in-loop filtering-related information for reconstructed samples of the current picture (S820). The encoding apparatus may perform an in-loop filtering procedure on the reconstructed samples, and may generate in-loop filtering-related information based on the in-loop filtering procedure. For example, the in-loop filtering-related information may include the information on the boundaries described above in the present disclosure (a tile boundary in-loop filtering available flag, a slice boundary in-loop filtering available flag, a tile slice in-loop filtering available flag, etc.).

The encoding apparatus may encode video/image information (S830). The image information may include residual information, prediction-related information, picture division-related information (e.g., subpicture-related information, slice-related information, tile-related information, etc.), and/or in-loop filtering-related information. The encoded video/image information may be output in the form of a bitstream. The bitstream may be transmitted to the decoding apparatus through a network or a storage medium.

The image/video information may include various information according to an embodiment of the present disclosure. For example, the image/video information may include information disclosed in at least one of Tables 1 to 17 described above.

In an embodiment, the at least one subpicture may include one or more slices. The at least one subpicture may include one or more tiles. Alternatively, each of the one or more slices may include one or more tiles. The image information may include in-loop filtering-related information. Based on the in-loop filtering-related information, it may be determined whether the in-loop filtering procedure for the reconstructed samples is performed across a boundary of the one or more tiles.

In an embodiment, the image information may include the PPS referred by the current picture. The PPS may include a first tile boundary in-loop filtering available flag and a second tile boundary in-loop filtering available flag. Based on the first tile boundary in-loop filtering available flag, it may be determined whether the in-loop filtering procedure for the reconstructed samples is performed across tile boundaries in a first subpicture. Based on the second tile boundary in-loop filtering available flag, it may be determined whether the in-loop filtering procedure for the reconstructed samples is performed across tile boundaries in a second subpicture.

In an embodiment, the image information may include the SPS referred by the current picture. The SPS may include a first tile slice boundary in-loop filtering available flag and a second tile slice boundary in-loop filtering available flag. Based on the first tile slice boundary in-loop filtering enabled flag, it may be determined whether the in-loop filtering procedure for the reconstructed samples is performed across tile boundaries and slice boundaries in the first subpicture. Based on the second tile slice boundary in-loop filtering enabled flag, it may be determined whether the in-loop filtering procedure for the reconstructed samples is performed across tile boundaries and slice boundaries in the second subpicture.

In an embodiment, the image information may include the SPS referred by the current picture. The SPS may include a first tile boundary in-loop filtering available flag and a second tile boundary in-loop filtering available flag. Based on the first tile boundary in-loop filtering available flag, it may be determined whether the in-loop filtering procedure for the reconstructed samples is performed across tile boundaries in a first subpicture. Based on the second tile boundary in-loop filtering available flag, it may be determined whether the in-loop filtering procedure for the reconstructed samples is performed across tile boundaries in a second subpicture.

In an embodiment, the image information may include the SPS referred by the current picture. The SPS may include a first slice boundary in-loop filtering available flag and a second slice boundary in-loop filtering available flag. Based on the first slice boundary in-loop filtering available flag, it may be determined whether the in-loop filtering procedure for the reconstructed samples is performed across slice boundaries in a first subpicture. Based on the second slice boundary in-loop filtering enabled flag, it may be determined whether the in-loop filtering procedure for the reconstructed samples is performed across slice boundaries in a second subpicture.

In an embodiment, the image information may include the SPS referred by the current picture. The SPS may include a tile slice boundary in-loop filtering enabled flag. Based on the tile slice boundary in-loop filtering available flag, it may be determined whether the in-loop filtering procedure for the reconstructed samples is performed across tile boundaries and slice boundaries in subpictures referring to the SPS.

In an embodiment, the image information may include the PPS referred by the current picture. The PPS may include a tile slice boundary in-loop filtering enabled flag. Based on the tile slice boundary in-loop filtering enabled flag, it may be determined whether the in-loop filtering procedure for the reconstructed samples is performed across tile boundaries and slice boundaries in subpictures referring to the PPS.

FIGS. 10 and 11 schematically illustrate an example of a video/image decoding method and related components according to embodiment(s) of the present disclosure.

The method disclosed in FIG. 10 may be performed by the decoding apparatus disclosed in FIG. 3 or 11. Specifically, for example, S1000 of FIG. 10 may be performed by the entropy decoder 310 of the decoding apparatus, S1010 may be performed by the residual processor 320 and/or the adder 340 of the decoding apparatus, and S1020 may be performed by the filter 350 of the decoding apparatus. The method disclosed in FIG. 9 may include the embodiments described above in the present disclosure.

Referring to FIG. 10, the decoding apparatus may receive/obtain video/image information (S1000). The video/image information may include residual information, prediction-related information, picture division-related information (e.g., subpicture-related information, slice-related information, tile-related information, etc.), and/or in-loop filtering-related information. For example, the in-loop filtering-related information may include the information on the boundaries described above in the present disclosure (a tile boundary in-loop filtering available flag, a slice boundary in-loop filtering available flag, a tile slice in-loop filtering available flag, etc.).

The decoding apparatus may receive/obtain the image/video information through a bitstream.

The image/video information may include various information according to an embodiment of the present disclosure. For example, the image/video information may include information disclosed in at least one of Tables 1 to 17 described above.

The decoding apparatus may derive quantized transform coefficients. The decoding apparatus may derive quantized transform coefficients based on the residual information. The quantized transform coefficients may have a one-dimensional vector form based on a coefficient scan order. The quantized transform coefficients may include quantized luma transform coefficients and/or quantized chroma transform coefficients.

The decoding apparatus may derive transform coefficients. The decoding apparatus may derive transform coefficients based on a dequantization procedure for the quantized transform coefficients. The decoding apparatus may derive luma transform coefficients through dequantization based on the quantized luma transform coefficients. The decoding apparatus may derive chroma transform coefficients through dequantization based on the quantized chroma transform coefficients.

The decoding apparatus may generate/derive residual samples. The decoding apparatus may derive residual samples based on the inverse transform procedure for the transform coefficients. The decoding apparatus may derive residual luma samples through the inverse transform procedure based on the luma transform coefficients. The decoding apparatus may derive residual chroma samples through the inverse transform procedure based on the chroma transform coefficients.

The decoding apparatus may generate/derive reconstructed samples (S1010). For example, the decoding apparatus may generate/derive reconstructed luma samples and/or reconstructed chroma samples. The decoding apparatus may generate reconstructed luma samples and/or reconstructed chroma samples based on the residual information. The decoding apparatus may generate reconstructed samples based on the residual information. The reconstructed samples may include reconstructed luma samples and/or reconstructed chroma samples. A luma component of the reconstructed samples may correspond to the reconstructed luma samples, and a chroma component of the reconstructed samples may correspond to the reconstructed chroma samples. The decoding apparatus may generate predicted luma samples and/or predicted chroma samples through a prediction procedure. The decoding apparatus may generate reconstructed luma samples based on the predicted luma samples and the residual luma samples. The decoding apparatus may generate reconstructed chroma samples based on the predicted chroma samples and the residual chroma samples.

The decoding apparatus may generate modified (filtered) reconstructed samples (S1020). The decoding apparatus may generate modified reconstructed samples based on an in-loop filtering procedure for the reconstructed samples. The decoding apparatus may generate modified reconstructed samples based on in-loop filtering-related information. The decoding apparatus may use a deblocking filtering procedure, a SAO procedure, and/or an ALF procedure to generate the modified reconstructed samples.

In an embodiment, the at least one subpicture may include one or more slices. The at least one subpicture may include one or more tiles. Alternatively, each of the one or more slices may include one or more tiles. The image information may include in-loop filtering-related information. Based on the in-loop filtering-related information, it may be determined whether the in-loop filtering procedure for the reconstructed samples is performed across a boundary of the one or more tiles.

In an embodiment, the image information may include the PPS referred by the current picture. The PPS may include a first tile boundary in-loop filtering available flag and a second tile boundary in-loop filtering available flag. Based on the first tile boundary in-loop filtering available flag, it may be determined whether the in-loop filtering procedure for the reconstructed samples is performed across tile boundaries in a first subpicture. Based on the second tile boundary in-loop filtering available flag, it may be determined whether the in-loop filtering procedure for the reconstructed samples is performed across tile boundaries in a second subpicture.

In an embodiment, the image information may include the SPS referred by the current picture. The SPS may include a first tile slice boundary in-loop filtering available flag and a second tile slice boundary in-loop filtering available flag. Based on the first tile slice boundary in-loop filtering enabled flag, it may be determined whether the in-loop filtering procedure for the reconstructed samples is performed across tile boundaries and slice boundaries in the first subpicture. Based on the second tile slice boundary in-loop filtering enabled flag, it may be determined whether the in-loop filtering procedure for the reconstructed samples is performed across tile boundaries and slice boundaries in the second subpicture.

In an embodiment, the image information may include the SPS referred by the current picture. The SPS may include a first tile boundary in-loop filtering available flag and a second tile boundary in-loop filtering available flag. Based on the first tile boundary in-loop filtering available flag, it may be determined whether the in-loop filtering procedure for the reconstructed samples is performed across tile boundaries in a first subpicture. Based on the second tile boundary in-loop filtering available flag, it may be determined whether the in-loop filtering procedure for the reconstructed samples is performed across tile boundaries in a second subpicture.

In an embodiment, the image information may include the SPS referred by the current picture. The SPS may include a first slice boundary in-loop filtering available flag and a second slice boundary in-loop filtering available flag. Based on the first slice boundary in-loop filtering available flag, it may be determined whether the in-loop filtering procedure for the reconstructed samples is performed across slice boundaries in a first subpicture. Based on the second slice boundary in-loop filtering enabled flag, it may be determined whether the in-loop filtering procedure for the reconstructed samples is performed across slice boundaries in a second subpicture.

In an embodiment, the image information may include the SPS referred by the current picture. The SPS may include a tile slice boundary in-loop filtering enabled flag. Based on the tile slice boundary in-loop filtering available flag, it may be determined whether the in-loop filtering procedure for the reconstructed samples is performed across tile boundaries and slice boundaries in subpictures referring to the SPS.

In an embodiment, the image information may include the PPS referred by the current picture. The PPS may include a tile slice boundary in-loop filtering enabled flag. Based on the tile slice boundary in-loop filtering enabled flag, it may be determined whether the in-loop filtering procedure for the reconstructed samples is performed across tile boundaries and slice boundaries in subpictures referring to the PPS.

When there is a residual sample for the current block, the decoding apparatus may receive information on the residual for the current block. Information on the residual may include transform coefficients on residual samples. The decoding apparatus may derive residual samples (or residual sample array) for the current block based on the residual information. Specifically, the decoding apparatus may derive quantized transform coefficients based on the residual information. The quantized transform coefficients may have a one-dimensional vector form based on a coefficient scan order. The decoding apparatus may derive transform coefficients based on a dequantization procedure for the quantized transform coefficients. The decoding apparatus may derive residual samples based on the transform coefficients.

The decoding apparatus may generate reconstructed samples based on (intra) prediction samples and residual samples, and may derive a reconstructed block or a reconstructed picture based on the reconstructed samples. In more detail, the decoding apparatus may generate reconstructed samples based on a sum of (intra) prediction samples and residual samples. Thereafter, as described above, the decoding apparatus may apply an in-loop filtering procedure such as deblocking filtering and/or SAO procedure to the reconstructed picture in order to improve subjective/objective picture quality, if necessary.

For example, the decoding apparatus may obtain image information including all or part of the above-described information (or syntax elements) by decoding the bitstream or encoded information. In addition, the bitstream or encoded information may be stored in a computer-readable storage medium, and may cause the above-described decoding method to be performed.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information (e.g., information on instructions) for implementation or an algorithm may be stored in a digital storage medium.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a virtual reality (VR) device, an argumente reality (AR) device, a video telephony video device, a transportation terminal (e.g., vehicle (including autonomous vehicle) terminal, airplane terminal, ship terminal, etc.), and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the embodiments of the present disclosure may be embodied as a computer program product by program codes, and the program codes may be executed on a computer by the embodiments of the present disclosure. The program codes may be stored on a computer-readable carrier.

FIG. 12 illustrates an example of a content streaming system to which embodiments disclosed in the present disclosure is applicable.

Referring to FIG. 12, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted.

The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD), a digital TV, a desktop computer, a digital signage or the like.

Each of servers in the contents streaming system may be operated as a distributed server, and in this case, data received by each server may be processed in distributed manner.

The claims described herein may be combined in various ways. For example, the technical features of the method claims of the present specification may be combined to be implemented as an apparatus, and the technical features of the apparatus claims of the present specification may be combined to be implemented as a method. In addition, the technical features of the method claims of the present specification and the technical features of the apparatus claims may be combined to be implemented as an apparatus, and the technical features of the method claims of the present specification and the technical features of the apparatus claims may be combined to be implemented as a method.

The invention claimed is:

1. An image decoding method performed by a decoding apparatus, comprising:
obtaining image information including subpicture-related information and residual information through a bitstream;
dividing a current picture into at least one subpicture based on the subpicture-related information;
generating reconstructed samples of the current picture based on the residual information; and generating modified reconstructed samples based on an in-loop filtering procedure for the reconstructed samples, wherein the at least one subpicture includes one or more rectangular slices, wherein the one or more rectangular slices are included in one or more tiles, wherein the image information includes in-loop filtering-related information, wherein whether the in-loop filtering procedure for the reconstructed samples is performed across at least one of a boundary of the one or more tiles or a boundary of the one or more rectangular slices in the current picture is determined based on the in-loop filtering-related information, wherein the image information includes a picture parameter set (PPS) referred by the current picture and a sequence parameter set (SPS) referred by the current picture, wherein the image information includes a tile boundary in-loop filtering available flag for the at least one subpicture in the current picture, wherein, based on the tile boundary in-loop filtering available flag for the at least one subpicture, whether the in-loop filtering procedure for the reconstructed samples is performed across the boundary of the one or more tiles in at least one subpicture is determined, wherein the image information includes a slice boundary in-loop filtering available flag for the one or more tiles in the current picture, wherein, based on the slice boundary in-loop filtering available flag for the one or more tiles, whether the in-loop filtering procedure for the reconstructed samples is performed across the boundary of the one or more rectangular slices in the one or more tiles is determined, and wherein tile boundary in-loop filtering available flags for at least two subpictures that contain the one or more rectangular slices that belong to a same tile are identical to each other.

2. The method of claim 1,
wherein the PPS includes a first tile boundary in-loop filtering available flag and a second tile boundary in-loop filtering available flag,
wherein whether the in-loop filtering procedure for the reconstructed samples is performed across tile boundaries in a first subpicture is determined based on the first tile boundary in-loop filtering available flag, and
wherein whether the in-loop filtering procedure for the reconstructed samples is performed across tile boundaries in a second subpicture is determined based on the second tile boundary in-loop filtering available flag.

3. The method of claim 1,
wherein the SPS includes a first tile slice boundary in-loop filtering available flag and a second tile slice boundary in-loop filtering available flag,
wherein whether the in-loop filtering procedure for the reconstructed samples is performed across tile boundaries and slice boundaries in a first subpicture is determined based on the first tile slice boundary in-loop filtering available flag, and
wherein whether the in-loop filtering procedure for the reconstructed samples is performed across tile boundaries and slice boundaries in a second subpicture is determined based on the second tile slice boundary in-loop filtering available flag.

4. The method of claim 1,
wherein the SPS includes a first tile boundary in-loop filtering available flag and a second tile boundary in-loop filtering available flag,
wherein whether the in-loop filtering procedure for the reconstructed samples is performed across tile boundaries in a first subpicture is determined based on the first tile boundary in-loop filtering available flag, and
wherein whether the in-loop filtering procedure for the reconstructed samples is performed across tile boundaries in a second subpicture is determined based on the second tile boundary in-loop filtering available flag.

5. The method of claim 1,
wherein the SPS includes a first slice boundary in-loop filtering available flag and a second slice boundary in-loop filtering available flag,
wherein whether the in-loop filtering procedure for the reconstructed samples is performed across slice boundaries in a first subpicture is determined based on the first slice boundary in-loop filtering available flag, and
wherein whether the in-loop filtering procedure for the reconstructed samples is performed across slice boundaries in a second subpicture is determined based on the second slice boundary in-loop filtering available flag.

6. The method of claim 1,
wherein the SPS includes a tile slice boundary in-loop filtering available flag, and
wherein whether the in-loop filtering procedure for the reconstructed samples is performed across tile boundaries and slice boundaries in subpictures referring to the SPS is determined based on the tile slice boundary in-loop filtering available flag.

7. The method of claim 1,
wherein the PPS includes a tile slice boundary in-loop filtering available flag, and
wherein whether the in-loop filtering procedure for the reconstructed samples is performed across tile boundaries and slice boundaries in subpictures referring to the PPS is determined based on the tile slice boundary in-loop filtering available flag.

8. An image encoding method performed by an encoding apparatus, comprising:
dividing a current picture into at least one subpicture;
generating subpicture-related information based on the at least one subpicture;
generating residual samples for a current block in the current picture;
generating residual information based on the residual samples for the current block;
generating in-loop filtering-related information on reconstructed samples of the current picture; and
encoding image information including the subpicture-related information, the residual information, and the in-loop filtering-related information,
wherein the at least one subpicture includes one or more rectangular slices,
wherein the one or more rectangular slices are included in one or more tiles, and
wherein whether in-loop filtering procedure for the reconstructed samples is performed across at least one of a boundary of the one or more tiles or a boundary of the one or more rectangular slices in the current picture is determined based on the in-loop filtering-related information, wherein the image information includes a picture parameter set (PPS) referred by the current picture and a sequence parameter set (SPS) referred by the current picture, wherein the image information includes a tile boundary in-loop filtering available flag for the at least one subpicture in the current picture, wherein, based on the tile boundary in-loop filtering available flag for the at least one subpicture, whether the in-loop filtering procedure for the reconstructed samples is performed across the boundary of the tiles in the at least one subpicture is determined, wherein the image information includes a slice boundary in-loop filtering available flag for the one or more tiles in the current picture, wherein, based on the slice boundary in-loop filtering available flag for the one or more tiles, whether the in-loop filtering procedure for the reconstructed samples is performed across the boundary of the rectangular slices in the one or more tiles is determined, and wherein tile boundary in-loop filtering available flags for at least two subpictures that contain the one or more rectangular slices that belong to a same tile are identical to each other.

9. The method of claim 8, wherein the PPS includes a first tile boundary in-loop filtering available flag and a second tile boundary in-loop filtering available flag, wherein whether the in-loop filtering procedure for the reconstructed samples is performed across tile boundaries in a first subpicture is determined based on the first tile boundary in-loop filtering available flag, and wherein whether the in-loop filtering procedure for the reconstructed samples is performed across tile boundaries in a second subpicture is determined based on the second tile boundary in-loop filtering available flag.

10. The method of claim 8, wherein the SPS includes a first tile slice boundary in-loop filtering available flag and a second tile slice boundary in-loop filtering available flag, wherein whether the in-loop filtering procedure for the reconstructed samples is performed across tile boundaries and slice boundaries in a first subpicture is determined based on the first tile slice boundary in-loop filtering available flag, and wherein whether the in-loop filtering procedure for the reconstructed samples is performed across tile boundaries and slice boundaries in a second subpicture is determined based on the second tile slice boundary in-loop filtering available flag.

11. The method of claim 8, wherein the SPS includes a first tile boundary in-loop filtering available flag and a second tile boundary in-loop filtering available flag, wherein whether the in-loop filtering procedure for the reconstructed samples is performed across tile boundaries in a first subpicture is determined based on the first tile boundary in-loop filtering available flag, and wherein whether the in-loop filtering procedure for the reconstructed samples is performed across tile boundaries in a second subpicture is determined based on the second tile boundary in-loop filtering available flag.

12. The method of claim 8, wherein the SPS includes a first slice boundary in-loop filtering available flag and a second slice boundary in-loop filtering available flag, wherein whether the in-loop filtering procedure for the reconstructed samples is performed across slice boundaries in a first subpicture is determined based on the first slice boundary in-loop filtering available flag, and wherein whether the in-loop filtering procedure for the reconstructed samples is performed across slice boundaries in a second subpicture is determined based on the second slice boundary in-loop filtering available flag.

13. The method of claim 8, wherein the SPS includes a tile slice boundary in-loop filtering available flag, and wherein whether the in-loop filtering procedure for the reconstructed samples is performed across tile boundaries and slice boundaries in subpictures referring to the SPS is determined based on the tile slice boundary in-loop filtering available flag.

14. The method of claim 8, wherein the PPS includes a tile slice boundary in-loop filtering available flag, and wherein whether the in-loop filtering procedure for the reconstructed samples is performed across tile boundaries and slice boundaries in subpictures referring to the PPS is determined based on the tile slice boundary in-loop filtering available flag.

15. A non-transitory computer-readable storage medium for storing a bitstream generated by an image encoding method, the image encoding method comprising:

dividing a current picture into at least one subpicture;

generating subpicture-related information based on the at least one subpicture;

generating residual samples for a current block in the current picture;

generating residual information based on the residual samples for the current block;

generating in-loop filtering-related information on reconstructed samples of the current picture; and encoding image information including the subpicture-related information, the residual information, and the in-loop filtering-related information, wherein the at least one subpicture includes one or more rectangular slices, wherein the one or more rectangular slices are included in one or more tiles, wherein whether in-loop filtering procedure for the reconstructed samples is performed across at least one of a boundary of the one or more tiles or a boundary of the one or more rectangular slices in the current picture is determined based on the in-loop filtering-related information, wherein the image information includes a picture parameter set (PPS) referred by the current picture and a sequence parameter set (SPS) referred by the current picture, wherein the image information includes a tile boundary in-loop filtering available flag for the at least one subpicture in the current picture, wherein, based on the tile boundary in-loop filtering available flag for the at least one subpicture, whether the in-loop filtering procedure for the reconstructed samples is performed across the boundary of the tiles in at least one subpicture is determined, wherein the image information includes a slice boundary in-loop filtering available flag for the one or more tiles in the current picture, wherein, based on the slice boundary in-loop filtering available flag for the one or more tiles, whether the in-loop filtering procedure for the reconstructed samples is performed across the boundary of the rectangular slices in the one or more tiles is determined, and wherein tile boundary in-loop filtering available flags for at least two subpictures that contain the one or more rectangular slices that belong to a same tile are identical to each other.

* * * * *